United States Patent [19]

Pandelisev

[11] Patent Number: 5,753,918
[45] Date of Patent: *May 19, 1998

[54] SUPERIOR PERFORMANCE SUBASSEMBLY FOR SCINTILLATION DETECTION AND DETECTORS EMPLOYING THE SUBASSEMBLY

[75] Inventor: Kiril A. Pandelisev, Mesa, Ariz.

[73] Assignee: Optoscint, Inc., Scottsdale, Ariz.

[*] Notice: The term of this patent shall not extend beyond the expiration date of Pat. No. 5,548,116.

[21] Appl. No.: 634,213

[22] Filed: Apr. 18, 1996

Related U.S. Application Data

[60] Provisional application No. 60/005,364 Oct. 19, 1995.

[51] Int. Cl.$^6$ .................................................... G01V 5/04
[52] U.S. Cl. ............................... 250/368; 250/269.1
[58] Field of Search ...................... 250/269.1, 361 R, 250/368, 483.1, 256

[56] References Cited

U.S. PATENT DOCUMENTS

| | | | |
|---|---|---|---|
| 4,631,409 | 12/1986 | Sparacia et al. | 250/361 R |
| 4,658,141 | 4/1987 | Wilt et al. | 250/361 R |
| 4,700,074 | 10/1987 | Bosnjakovic | 250/363 |
| 4,720,426 | 1/1988 | Englert et al. | 428/344 |
| 4,764,677 | 8/1988 | Spurney | 250/361 R |
| 5,241,180 | 8/1993 | Ishaque et al. | 250/361 R |
| 5,264,154 | 11/1993 | Akiyama et al. | 250/483.1 |
| 5,548,116 | 8/1996 | Pandelisev | 250/256 |

*Primary Examiner*—Michael J. Tokar
*Assistant Examiner*—Richard Haning
*Attorney, Agent, or Firm*—James Creighton Wray; Meera P. Narasimhan

[57] ABSTRACT

The crystals are sealed by either glass-to-metal seals or epoxy to prevent moisture degradation. Combined with the multiple moisture barriers, the new configurations are long lasting and provide long life for the modular detectors. The crystal geometry depends on the application. The crystal surfaces are shaped in such a way that provide minimum optical paths of the light photons. The cladding layers and the mirror system provide gas-free, high reflectivity crystal mirror surfaces. The mirrors can be specular or diffusive. Curved shapes at the photo detector sides provide the first step in focusing the light. Focused photon beams are easily translated into smaller photodetectors that have higher signal-to-noise ratio, are more compact in nature, are more economical. Crystals have upper and lower truncated conical or pyramidal portions and intermediate straight wall portions. The crystals have rounded bottoms and tops, and cladding on the crystals and mirrors on the cladding or on interior walls of a housing. Through-holes receive tubes to pass fluent material through the crystals. Wells with sloping walls bring the emitting materials close to the crystals. The truncated shapes minimize optical paths of photons generated in the crystals. Housings have upper and lower sections which follow the crystal shapes. Thin ring peripheral edges are joined. Unitary drop-in housings have housing extensions backed by epoxy wedges to follow the crystal, cladding and mirror shapes.

100 Claims, 20 Drawing Sheets

289
280

R1

R2

SUPERIOR PERFORMANCE SUBASSEMBLY FOR SCINTILLATION DETECTION AND DETECTORS EMPLOYING THE SUBASSEMBLY

BACKGROUND OF THE INVENTION

This application is based on Provisional application Ser. No. 60/005,364 filed Oct. 19, 1995.

Radiation detectors have scintillation crystals and photodetectors. The crystal converts the high energy radiation into visible light photons, while the photodetector converts the photons into electrical current. Later on the signal is amplified and processed in a manner demanded by the particular application.

Detector performance depends on various characteristics of: the absorption of the detector housing to prevent or to allow the gamma rays or X-rays to reach the crystal, the crystal quality to react with the rays and to produce as many as possible visible light photons, the crystal subassembly to direct the photons to the photodetector with as few as possible reflections and with minimal loss due to absorption within the crystal and at the crystal surface, and the photodetector efficiency to transform all incoming photons into electrical current. Typically detectors are made using rectangularly shaped crystals. Housings are made from aluminum or steel. Reflectors are made of diffuse reflecting materials. In all cases there exists very high probability of gas pockets at the interface (air, nitrogen, argon, etc.) that affects the surface reflectivity. Also, that type of packaging allows the crystals to move during ruggedized applications, creating static discharges that lead to false reading. Gas bubbles or particles at the crystal-optical coupler interfaces, reduce resolution. Losses of light photons are large, and the signals are much less than optimum.

SUMMARY OF THE INVENTION

The invention provides optimization of the radiation detector performance. The outer housing, the crystal subassembly and the crystal geometry for various radiation detectors are chosen to give full detection of most of the spectrum of the incoming radiation, to collect all light photons and to direct them towards the photodetector with minimal loss.

The new crystal housing allows all applications. In the most ruggedized, such as oil drilling applications, the crystals are subjected to high temperatures and vibrations, to the various applications in nuclear physics and chemistry. The invention provides detection of low energy gamma rays by using special configurations that minimize radiation absorption. The crystals are sealed by either glass-to-metal seals or epoxy to prevent moisture degradation. Combined with the multiple moisture barriers, the new configurations are long lasting and provide long life for the detector. The new invention allows for construction of modular detectors.

The crystal geometry depends on the application. In any case the crystal surfaces are shaped in such a way that provide minimum optical paths of the light photons. The cladding layers and the mirror system provide gas-free, high reflectivity crystal mirror surfaces. The mirrors can be specular or diffusive. Curved shapes at the photo detector sides provide the first step in focusing the light. Focused photon beams are easily translated into smaller photodetectors that have higher signal-to-noise ratio, are more compact in nature, are more economical, and that possibly provide easier operation.

This invention provides ways to apply high reflective surfaces that do not react with the crystal and which do not compromise the crystal performance. Highly reflective specular or diffuse mirror surfaces can be used.

The present invention relates to crystal/cladding/reflective layer subassemblies and structures for use in scintillation detectors.

All configurations of the subassemblies can be used with or without standard optical systems, depending on the application and the need for complexity. All subassemblies can be used as a subassembly with a glass plate coupled to the crystal by means of an optical coupler, or they can be used in conjunction with outer casings and/or cushioning layers and optical systems.

A crystal/cladding/reflective subassembly used in scintillator detectors has a crystal, at least one cladding layer surrounding one end and sides of the crystal, and a reflective layer surrounding the cladding. In one form, the crystal has a generally truncated conical or pyramidal shape, with the sides of the crystal extending upward and outward from a bottom to a top of the crystal. In one embodiment, cladding layers have equal thicknesses. In another embodiment, at least one cladding layer has an angle of slope that is greater than a corresponding angle of slope of the crystal, thereby creating a layer having a wedge shape, with the layer increasing in thickness as the layer extends upward.

In one form, the crystal has a generally polygonal, rectangular or cylindrical shape, with the sides of the crystal generally parallel and the top and bottom of the crystal generally parallel.

In one embodiment, at least one cladding layer has a wedge shape, with the layer increasing in thickness as the layer extends upward from the bottom to the top of the crystal. At least one cladding layer has an equal thickness.

A preferred scintillator detector apparatus has a crystal with a top, sides and a bottom. At least one cladding layer surrounds the bottom and sides of the crystal. A reflective layer surrounds at least one cladding layer. A housing surrounds the reflective layer, and an optical system is positioned above the top of the crystal. The optical system has lenses, a glass plate and an optical coupler for coupling the glass plate to the top of the crystal. The crystal has a generally conical shape, with the sides of the crystal extending upward and outward from the bottom of the crystal to the top of the crystal.

A preferred scintillator detector apparatus has a crystal with a top, sides and a bottom. At least one cladding layer surrounds the bottom and sides of the crystal, and a reflective layer surrounds at least one cladding layer. A housing surrounds the reflective layer, and an optical system is positioned above the top of the crystal. The optical system has lenses, a glass plate and an optical coupler for coupling the glass plate to the top of the crystal. The crystal has a generally rectangular shape, with the sides of the crystal generally parallel and the top and bottom of the crystal generally parallel. At least one cladding layer has wedge shape, with the layer increasing in thickness as the layer extends upward from the bottom to the top of the crystal.

In one embodiment, a crystal/cladding/reflective subassembly used in scintillator detectors has a crystal with a convex top, a convex bottom, and sides. At least one cladding layer surrounds the convex bottom and the sides of the crystal, and a reflective layer surrounds at least one cladding layer.

In preferred embodiments, the crystal has a generally conical shape, with the sides of the crystal extending upward and outward from the bottom of the crystal to the top of the crystal.

A preferred scintillator detector apparatus has a crystal/ cladding/reflective layer subassembly and a housing surrounding the subassembly, and the housing has at least one low energy gamma ray window. At least one window is circular or rectangular. The window may be multiple windows, with the windows arranged in a grill-shaped configuration.

The housing is made of a material selected from the group consisting of metal, metal alloys, a composite material, and a combination of metal, metal alloys or composite material.

A cushioning layer is positioned between the subassembly and the housing, and the housing has at least one protrusion extending inward from the housing towards the subassembly and being embedded in the cushioning material.

The crystal/cladding/reflective subassembly has a crystal with a top, sides and a bottom. At least one cladding layer surrounds the bottom and sides of the crystal, and a reflective layer surrounds at least one cladding layer. One crystal has a generally conical shape, with the sides of the crystal extending upward and outward from the bottom of the crystal to the top of the crystal. Another crystal has a generally rectangular shape, with the sides of the crystal generally parallel and the top and bottom of the crystal generally parallel.

A preferred crystal/cladding/reflective subassembly used in scintillator detectors has a crystal with a top, sides, a bottom and a well extending upward from the bottom into the crystal. The well has a top wall and side walls extending downward from the top wall and joining the bottom of the crystal. At least one cladding layer surrounds the bottom and sides of the crystal and the top wall and side walls of the well, and a reflective layer surrounds at least one cladding layer.

The top wall of the well has a convex shape, and bottom of the crystal has a convex shape. The top of the crystal has a convex shape. The top wall of the well has a convex shape, the bottom of the crystal has a convex shape, and the top of the crystal has a convex shape.

A preferred well scintillator detector apparatus has a crystal/cladding/reflective layer subassembly and a housing surrounding the subassembly. The housing has at least one low energy gamma ray window. The subassembly has a crystal having a top, sides, a bottom and a well extending upward from the bottom into the crystal. The well has a top wall and side walls extending downward from the top wall and joining the bottom of the crystal. At least one cladding layer surrounds the bottom and sides of the crystal and the top wall and side walls of the well, and a reflective layer surrounds at least one cladding layer.

A preferred through-hole scintillator detector apparatus has a crystal/cladding/reflective layer subassembly and a housing surrounding the subassembly. The housing has at least one low energy gamma ray window. The subassembly has a crystal with a top, sides, a bottom and a hole positioned widthwise through the crystal and extending between the sides of the crystal. At least one cladding layer surrounds the bottom and sides of the crystal and the top wall and side walls of the well, and a reflective layer surrounds at least one cladding layer.

A preferred well logging scintillation detector apparatus has a crystal/cladding/reflective layer subassembly. A housing surrounds the subassembly, and an optical system is positioned above the top of the crystal. The optical system has lenses, at least one glass plate and an optical coupler for coupling the at least one glass plate to the top of the crystal. A photomultiplier is mounted above the optical system, and an electronics package is connected to the photomultiplier. A casing surrounds the subassembly, the housing, the photomultiplier, the electronics package and the optical system, and a source is positioned in the casing at a bottom or along a side wall of the casing.

The casing has at least one low energy gamma ray window.

In one form the reflective layer forms the inner surface of the housing. An optical coupler is positioned between the glass plate and the crystal, and an optical system is positioned between the glass plate and a photomultiplier.

A desiccant extends from the seal, and the seal includes an epoxy or a glass-to-metal seal. The seal has first and second rings positioned around the glass plate. The first ring is connected to the glass and the second ring is connected to the first ring and to the housing. The rings are connected to each other, the glass and the housing by welding, by soldering or by an epoxy. At least one moisture barrier is positioned between the glass plate, the first ring and the housing, and at least one moisture barrier is positioned between the second ring and the housing.

The seal has grooves positioned in a wall of the housing and extensions extend from the glass plate. The extensions fit into the grooves to effect the seal between the glass plate and the housing. At least one moisture barrier is positioned in a seal surface.

The seal has multiple rings positioned around the glass plate. An innermost ring of the multiple rings is connected to the glass, and other rings of the multiple rings are sealed to each other. The rings are connected to each other, the glass and the housing by welding, by soldering or by an epoxy.

At least one moisture barrier is positioned extending from the glass plate. The seal is a glass-to-metal seal or an epoxy that connects the glass plate to a top of the housing. At least one moisture barrier is positioned at a seal surface.

These and further and other objects and features of the invention are apparent in the disclosure, which includes the above and ongoing written specification, with the claims and the drawings.

BRIEF DESCRIPTION OF THE DRAWINGS

The Figures clearly illustrate the invention.

In FIG. 3 the crystal is generally cylindrical or rectangular. In FIG. 4 the crystal is of truncated conical or pyramidal shape.

DETAILED DESCRIPTION OF THE PREFERRED EMBODIMENT

Figure 1:
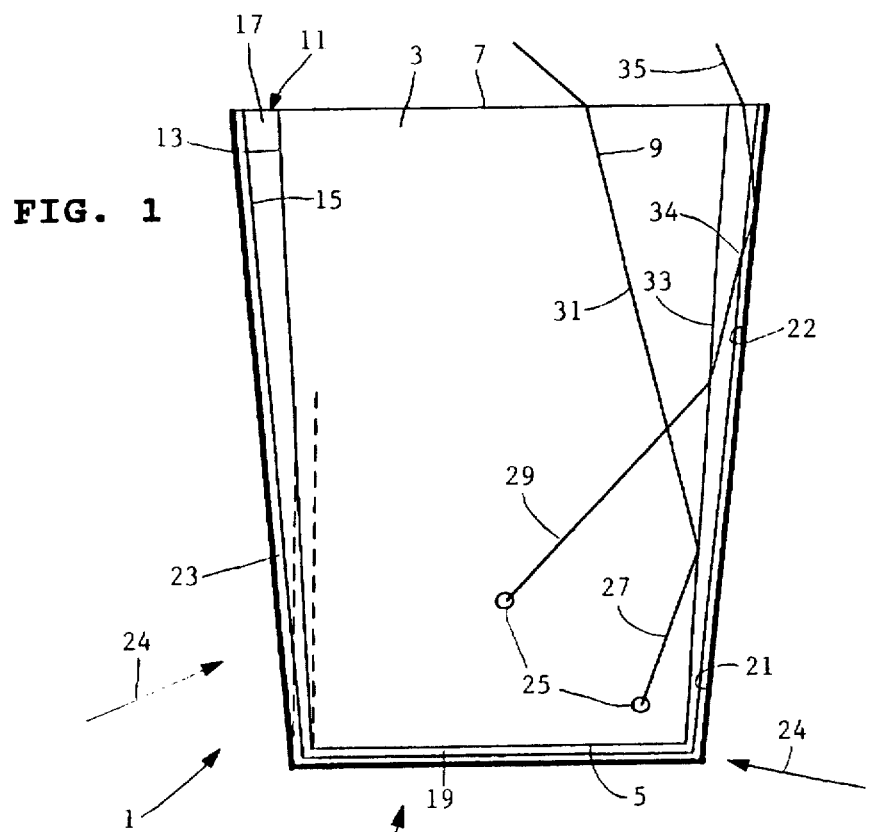
FIG. 1 is a schematic elevational cross-section of a crystal subassembly with truncated conical or pyramidal crystal and wedge-type or non-wedge type cladding layer or layers surrounded by a reflective surface. The shape of the crystal and the cladding layers minimizes the optical absorption of the photons created during the scintillation process.

Referring to FIG. 1, a crystal subassembly is generally indicated by the numeral 1. The crystal subassembly 1 has a crystal 3 with a flat bottom wall 5, a flat upper wall 7 and sloping side walls 9. The crystal may be a truncated conical crystal or a truncated pyramidal crystal with a rectangular or other polygonal base. The inner cladding layer 11 has an inner surface 13, which is tightly sealed to the outer surface 9 of the crystal, and an outer surface 15, which slopes upward and outward to a greater degree than the outer wall 9 of the crystal. The side wall portions 17 of the cladding 11 are wedge-shaped, and the bottom portion 19 is of substantially uniform thickness. A mirror 21 surrounds the cladding, and a second cladding layer 23 may be interposed between the mirror 21 and the first cladding layer 11.

As shown in FIG. 1, the second cladding 23 has substantially uniform thickness and has walls which are generally parallel to the outer wall 15 of the cladding layer 11. Mirror 21 has walls which are generally parallel to the outer walls 15 of the cladding layer 11.

When gamma rays strike simulation centers throughout the crystal, such as represented by 25, each gamma ray produces a photon. Depending on the incoming direction of the gamma ray, the photon may be released in any direction from the scintillation center 25. Pathways 27 and 29 are two possible paths of photons. When a photon leaves the scintillation site 25 and along a pathway 27 and impinges on a wall 9 at an incident angle to a normal of the surface 9, which is greater than the angle of total reflection, the photon will be reflected within the crystal along a pathway such as pathway 31, and will exit the face 7 of the crystal. When a photon exits the scintillation site 25 along a pathway such as 29 and encounters the wall 9 of the crystal at an incident angle which is less than the angle of total reflection, refraction occurs and the photon continues through the cladding layers to the mirror and reflects from the mirror 21, such as along pathways 33 and 35.

The photomultiplier 2, which extends across the face 7, extends across the entire upper surfaces of the crystal 3 and the claddings 11 and 23 so that all of the photons exiting the subassembly impinge on the photodetector. The sloping shape of the walls 9 and 15 and the walls of the reflector 21 reduce the path lengths of the photons in the system and thus reduce losses and absorption.

As shown in FIG. 1, a refraction occurs at the intersection of the side 9 of the crystal and the inside 13 of the inner cladding 11. When the outer cladding 23 has a differing index of refraction from the inner cladding 11 another refraction occurs, resulting in a pathway 34. Finally the photon travelling along pathway 34 is reflected by the inner surface 22 of the reflector 21. The purposes of the new crystal, cladding and reflector geometries is to reduce the optical paths through the crystal subassembly and thereby reduce losses.

Subsequent drawings have numbers similar to the numbers shown in FIG. 1.

Figure 2:
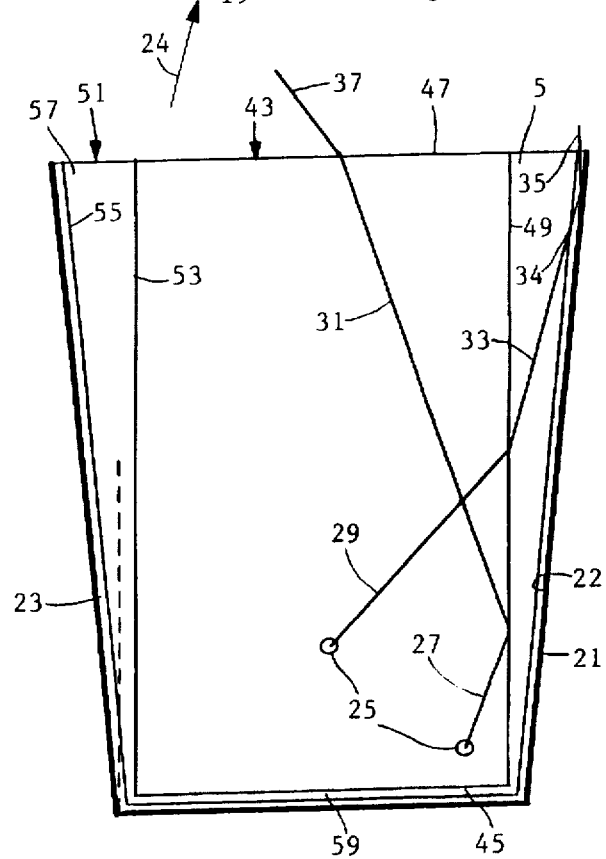
FIG. 2 is a schematic elevational cross-section of a crystal assembly showing a generally rectangular or cylindrical crystal having one or more cladding layers having wedge-type shapes surrounded by a housing having a sloping reflective surface on its inner lateral surface.

In FIG. 2, the crystal 43 has a base 45, a face 47 and side walls 49. The side walls 49 are generally perpendicular to the base 45 and face 47. Cladding 51 has an inner surface 53, which is adjacent the rectangular outer surface 49 of the crystal, and an outer surface 55 which is at an angle to an outer wall of the crystal. The outer cladding 23 is substantially uniform; the inner surface 22 of the mirror 21 is adjacent the outer cladding.

As shown in FIG. 2, a photon travelling along pathway 27 reflects against one side wall 49, travels along pathway 31, and finally the photon refracts along pathway 37 at the interface 47 of the crystal and the covering of the crystal, which may be either a glass plate or photomultiplier. An optical coupling exists between the surface 47 of the crystal, and the glass plate or photomultiplier. The bottom 59 of the inner cladding is substantially uniform along the bottom wall 45 of the crystal. When a photon travels along a path 29, it is refracted 33 at the interface of the outer wall 49 of the crystal 43 and the inner wall 53 of the wedge-shaped cladding 51.

The optical photon going along the optical path 31 is again refracted 34 at the interface with the outer cladding, and finally is reflected 35 at the inner reflective surface 22 of the reflector 21.

Figure 3:
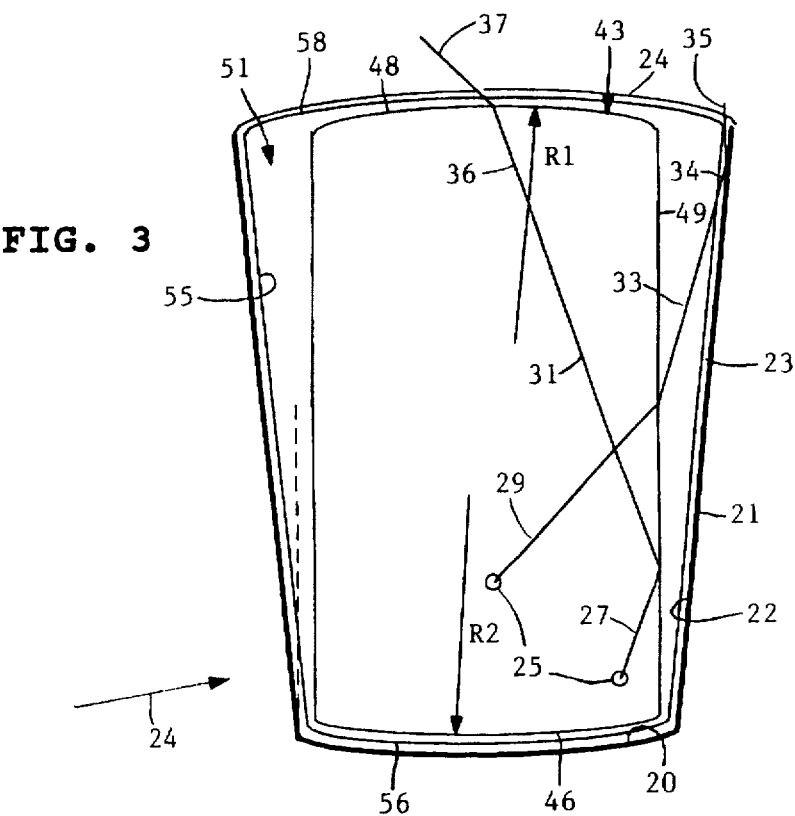
FIGS. 3 and 4 are schematic elevational cross-sections showing a crystal subassembly having cladding layers with or without wedge-type shapes. A reflective surface surrounds the cladding layers. The top and bottom of the crystal have convex shapes for optimization of the light reflection, collection and focusing.

FIG. 3 shows a subassembly which is similar to that shown in FIG. 2, except that the upper and lower surfaces are spherical or curved. Any appropriate curve may be used, for example the surfaces may be elliptical or parabolic, or any combination of curved surfaces may be used.

If the surfaces are spherical, they may have radiuses such as R1 and R2, which are simply schematically shown to indicate that the surfaces are curved. The numbers used in FIG. 3 are similar to the numbers used in FIG. 2, except where the elements are different. For example, the upper curved surface 48 and the lower curved surface 46 of the crystal 43, and the lower curved surface 56 and the upper curved surface 58 of the inner cladding layer 51 are different. The outer cladding layer 23 has an upper curved surface 24, and the mirror 21 has a lower curved surface 20.

The curved surfaces of the mirror, cladding layers and crystals aid in the directing of the photons to the photomultiplier or photodetector with the shortest optical pathways.

Figure 4:
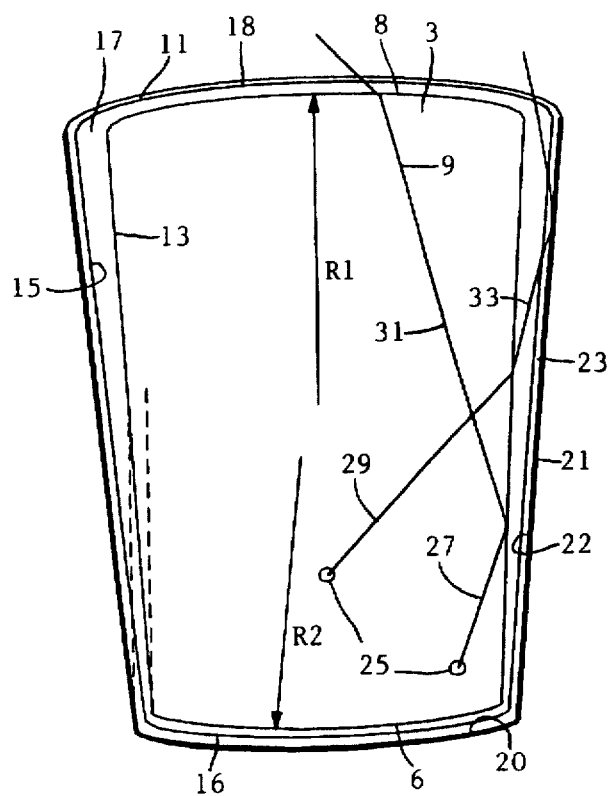

FIG. 4 combines elements of FIGS. 1 and 3, in that the crystal 3 has a generally truncated conical or pyramidal shape with sloping side walls 9. The crystal 3 has a curved lower surface 6 and a curved upper surface 8. The inner cladding 11, with the wedge-shaped wall 17, has a curved lower surface 16 and a curved upper surface 18. The mirror 21 has a curved lower surface 20. The radiuses of curvature are generally shown as R1 and R2 although, as in the case of FIG. 3, the curvatures could be spherical, parabolic, elliptical or some other regular or irregular curvature which would satisfy the function of the present invention, which is to shorten the optical paths, to enhance the light collection and to reduce losses within the subassembly. The particular claddings for the crystal have two purposes. One is to reduce the path lengths through the subassembly. The other is to provide a chemical barrier to allow for mounting of the metal reflector, which otherwise might not be mountable on the crystal.

The curved surfaces act as lenses, keeping the pathways more focused, and provide optical windows through which the photons travel. An optical coupler would be preferably uniformly positioned on the outer surface of the subassembly.

Figure 5:
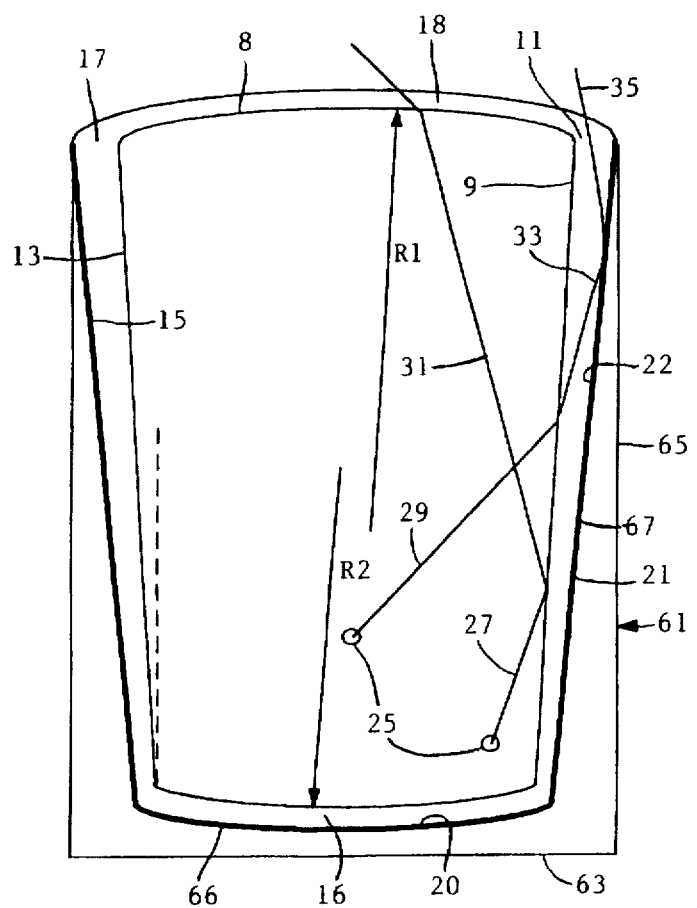
FIG. 5 schematically adds to the structure of FIG. 4 a cross-section of a metal housing with a reflective inner surface.

FIG. 5 is similar to FIG. 4, except that to the subassembly shown in FIG. 4 a housing 61 has been added. The housing has a base 63, a side wall 65 and an inner wall 67 on which the mirror 21 is bonded or formed. The interior surface 22 of the mirror may be the interior surface of the wall 67 of the housing 61. The curved inner lower surface 66 of the housing forms the lower inner surface 20 of the mirror.

In FIG. 5, the outer cladding has been eliminated for simplicity so that the mirror surface 22 is directly adjacent the outer surface 15 of the cladding wall 17.

Figure 6:
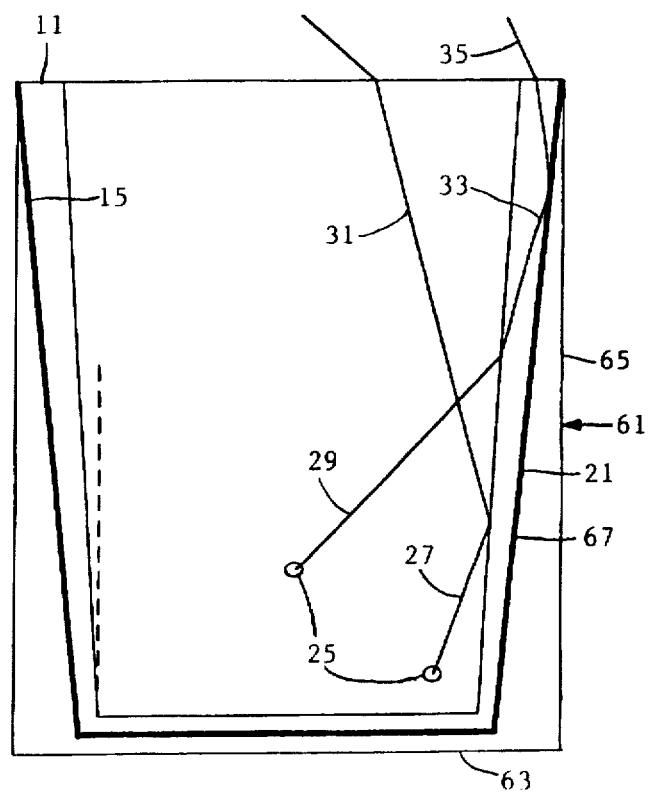
FIG. 6 schematically adds to the structure of FIG. 1 a metal housing with a reflective inner surface.

FIG. 6 combines elements of FIGS. 1 and 5, wherein the housing 61 is added to the subassembly similar to that shown in FIG. 1, with the absence of an outer cladding. The mirror 21 is supported directly on the inner wall 67 of the housing 61, and on the outer wall 15 of the cladding 11.

Figure 7:
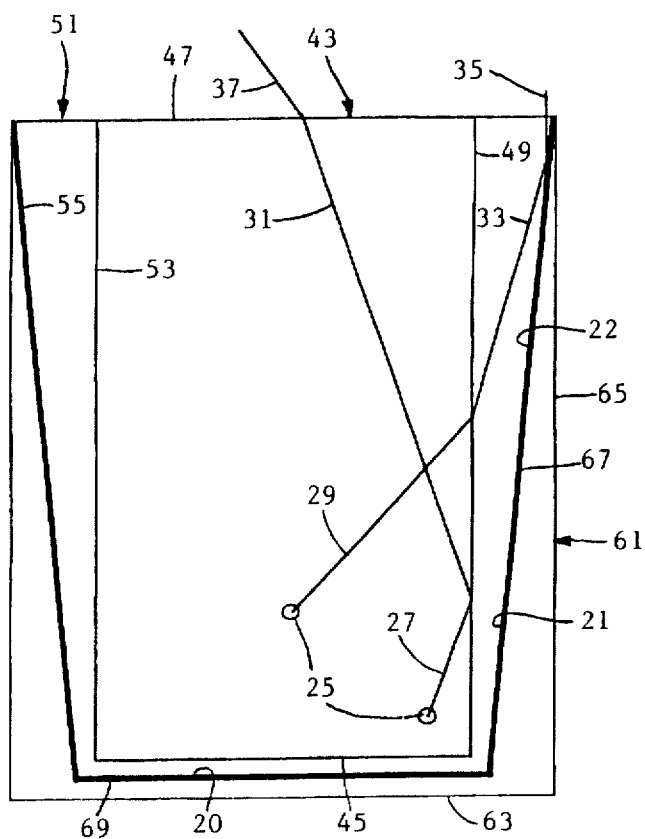
FIG. 7 schematically adds to the structure of FIG. 2 a metal housing with a reflective inner surface.

FIG. 7 combines elements of FIGS. 6 and 2, in which the housing 61 has an inner wall 67 which directly mounts the mirror 21. The reflective wall 22 may be the interior of a polished wall 67 of the housing 61. As shown, the outer cladding is eliminated, placing the mirror surface 22 directly on the outer wall 55 of the cladding 51. The base 20 of the mirror 21 rests directly against the inner surface 69 of the base 63 of housing 61.

Figure 8:
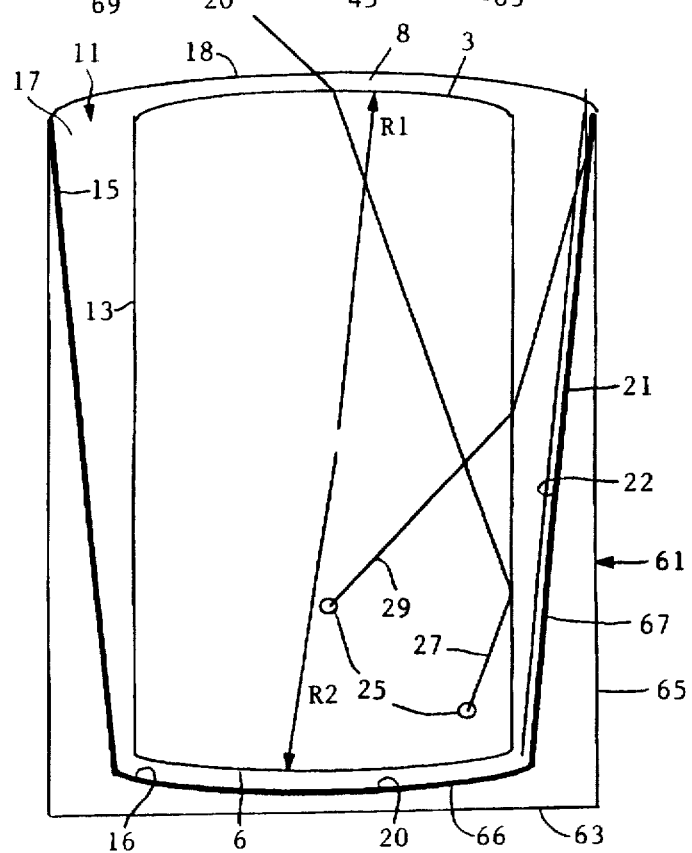
FIG. 8 schematically adds to the structure of FIG. 3 a metal housing with a reflective inner surface.

FIG. 8 combines features of FIGS. 7 and 4. Opposite surfaces 6 and 8 of crystal 3 are curved, and opposite surfaces 16 and 18 of cladding 11 are curved. Walls 13 and 15 of cladding 11 are sloped so that a wedge-shaped side wall 17 is formed, and the reflective surface 22 of the mirror 21 is placed directly against the outer wall of cladding 11. The mirror 21 is part of the casing 61 and forms the inner wall 67 of the casing. The bottom inner wall 66 of the casing is curved to receive the curved bottom 20 of the mirror.

Figure 9B:
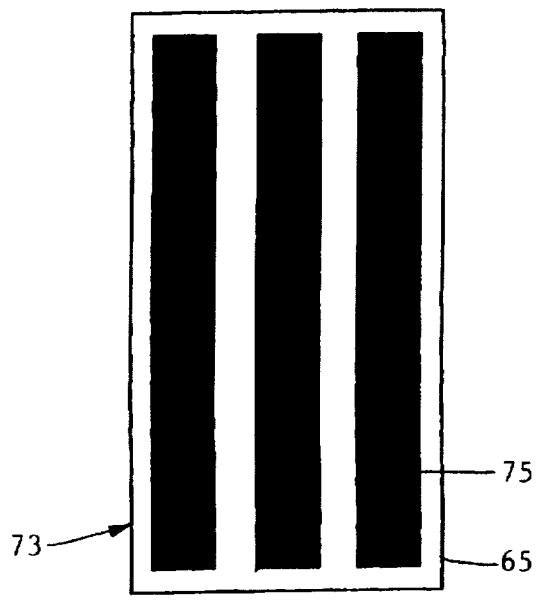
FIGS. 9A, 9B and 9C schematically show examples of low-energy gamma ray windows for housings and casings.
Figure 9C:
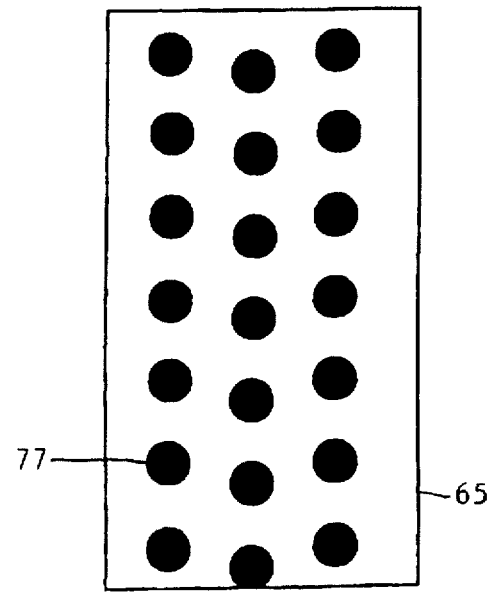
Figure 9A:
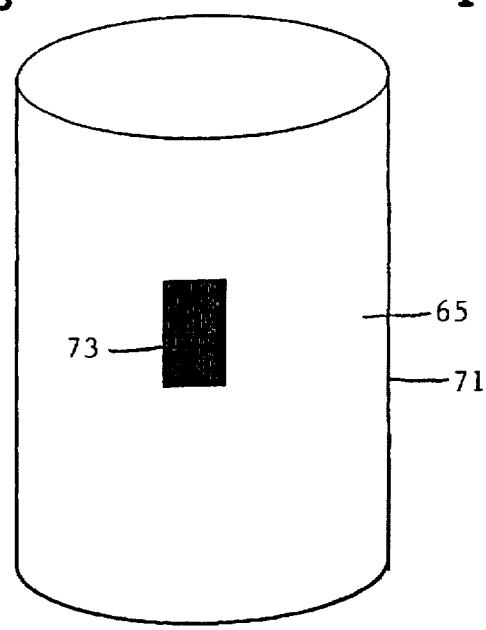

Referring to FIG. 9A, a housing 71, which may be the same as housing 61 shown in FIG. 8 and earlier figures, has a side wall 65 with at least one relatively low absorption gamma ray window 73. An optical subassembly such as shown in any of the FIGS. 1–8 may be placed inside of the housing 71. The attendant lenses and photodetectors may be assembled with the optical subassembly, such as positioning the subassembly within the housing 71, the lenses within the housing 71 and the photodetectors on top of the housing.

Different forms of windows 73 are shown in FIGS. 9B and 9C. The windows may comprise long strips 75 of low absorption gamma ray material within the side wall structure 65, either in a regular basis around the side wall, or in a specific area or areas of the side wall.

FIG. 9C shows small windows 77 of low gamma ray absorption material within the side wall 65, which forms a matrix around the windows.

The entire side wall 65 may be made out of the low gamma ray absorption window-type material 73, 75 and 77. The side wall 65 may be a steel wall with thin aluminum windows 73, 75 and 77, or both the housing such as the housing 61 shown in FIGS. 5–8, and outer casing such as the container 71 shown in FIG. 9A, may be made of the windowed material and may have the structures shown in FIGS. 9B and 9C, for example.

The casing or housing shown in FIG. 9A prevents damage, while allowing the gamma rays to go through the housing or casing. The housing may be a porous housing with empty spaces or spaces may be filled with low gamma resistant materials. Very thin metal layer tubes may be made to take care of the moisture problem, while providing the strength and form necessary to protect the structures. The purpose of all these structures is to maximize exposure of the crystal to the gamma radiations, and particularly to low energy gamma radiations, while maximizing the strengths of the structures.

Figure 10A:
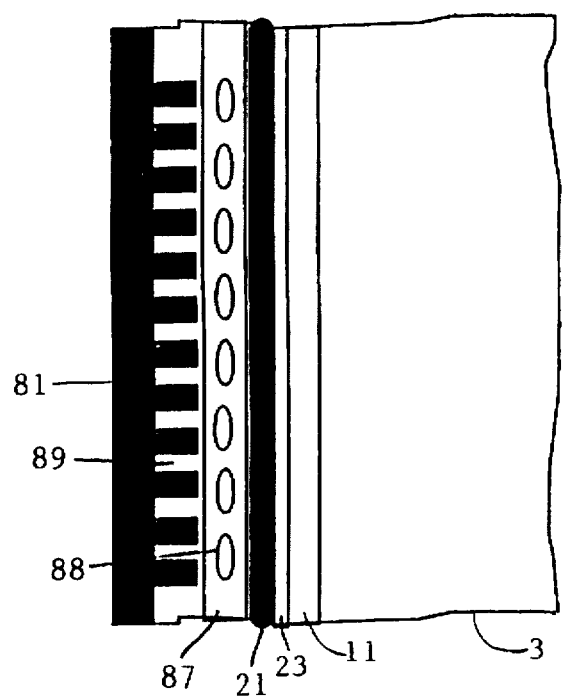
FIGS. 10A and 10B show a side cross-sectional view and a horizontal cross-sectional view of a housing to be used in rugged environments, such as oil well logging. The housing includes protrusions extending inward from the housing towards the crystal. The protrusions are embedded in the cushioning layer positioned between the housing and the reflector and cladding layers to minimize the strain and the stress on the crystal.
Figure 10B:
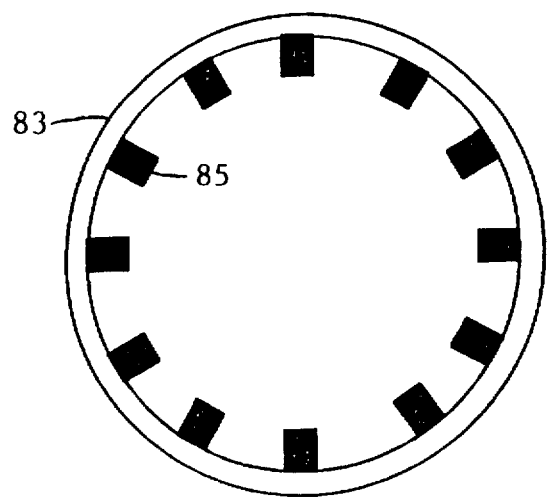

FIGS. 10A and 10B show a housing 81 for holding a subassembly with a crystal 3, cladding layers 11 and 23, and mirror 21. The metal housing has an outer shell 83 with inward projections 85, which fit into an elastomeric layer 87 with voids 88. The entire space between the housing 81 and the mirror 21 is filled with the elastomer, so that the elastomer 87 fills the spaces 89 between the projections. The housing 81 provides a rugged shock absorbing assembly for the crystal subassembly while permitting the passage of gamma rays. The housing 81 is a hard housing, which may be made of metal or composite material. The elastomer 87 may be made of a uniform layer or two different layers. The housing 81 and the elastomer 87 prevent relative movement of the crystal with the photodetector, while cushioning the crystal. Relative movement is apparent in prior art devices in which the crystal is pushed by a spring and a crystal moves, couples and decouples with a glass plate, allowing particles and air bubbles to migrate between the crystal and the glass plate, reducing the effectiveness of the system.

In prior art devices, moving crystals create static, giving extra counts and leading to false information.

In the present invention, the spikes 85 go into the elastomer and hold the elastomer in place, while the elastomer holds the mirror and crystal subassembly in place. The spikes may be rings, threads or any geometrical surfaces that will lock the elastomer in the hard housing.

Figure 11:
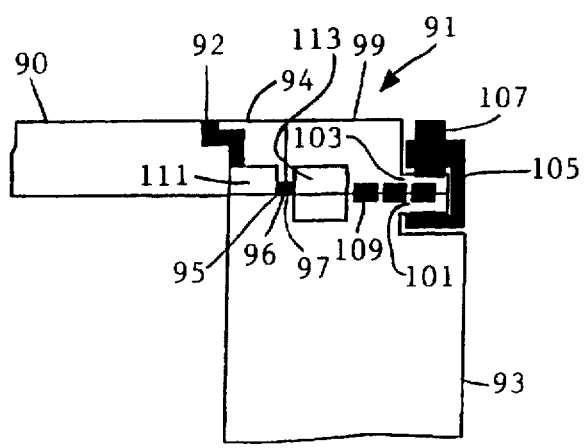
FIG. 11 is a partial elevational cross-sectional corner detail of mount for sealing a glass plate to a crystal housing using a glass to metal seal, welded rings, elastomer rings and clamps.

FIG. 11 shows a mounting 91 for mounting a glass plate 90 to a housing 93. The housing 93 can be identical to the housing 61 or the housing 71 shown in any one of the FIGS. 5–10.

The outer edge of the glass plate 90 is doped, and a glass-to-metal seal is formed on the outer edge. The glass-to-metal seal is generally indicated by the numeral 92. An L-shaped plate 94 is joined to the glass-to-metal seal 92. The L-shaped plate 94 has a thin edge portion 95 which is welded 96 to a thin edge portion 97 of an outer ring 99. The housing 93 has a projection 101 which cooperates with a projection 103 on the outer ring 99. A clamp 105 surrounds the projecting outer edges, and screws 107 tighten the clamp in place, compressing elastomer rings 109 in complementary recesses in the abutting faces of the outer ring 99 and the housing 93. Pockets 111 and 113 are filled with desiccant to prevent ingress of moisture and to getter any moisture within the housing as the housing is sealed using the clamp 105.

The structure of FIG. 11 is constructed by first welding the extensions 95 and 97 of the rings 94 and 99, and then sealing the assembled rings to the glass plate 90 with the glass-to-metal seal 92. Then desiccant is placed in the pockets 111 and 113, compression rings 109 are placed in the corresponding recesses, and the clamp 105 is applied and tightened with screws 107.

The structure of FIG. 11 is particularly useful for building modular units in which the units may be taken apart and reassembled under the correct conditions.

Figure 12:
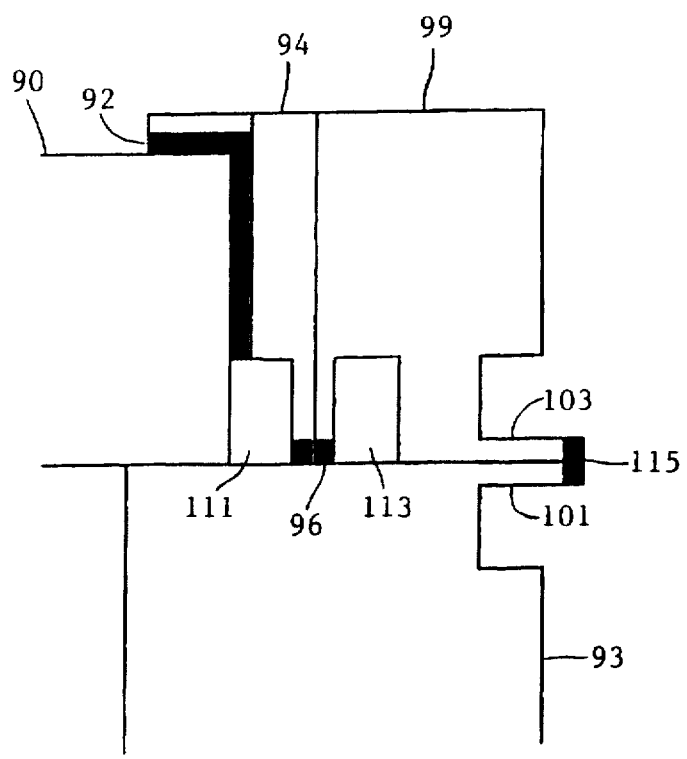
FIG. 12 is a partial elevational cross-sectional corner detail of a configuration used for sealing the glass plate to the housing by welding without damaging the crystal. The seal has two rings as shown, although more than two rings can be employed. There are plural desiccant pockets which act as moisture trapping barriers.

FIG. 12 shows a more permanent assembly in which the projections 101 and 103 on the housing 93 and outer ring 99 respectively are welded 115 at the tips. The thin welds 96 and 115 prevent heat flow to the glass plate. Weld 115 which is furthest from the glass plate is formed after the plate is connected to the inner ring.

In the assembly shown in FIG. 12, the outer ring is first welded to the inner ring with weld 96 between the L-shaped ring 94 and the outer ring 99. Then the glass-to-metal seal 92 is positioned, after first doping the outer edge of the plate 90. Finally the weld 115 is formed between the projections 101 and 103 on the housing and outer ring respectively. Desiccant pockets 111 and 113, similar to the desiccant pockets used in the FIG. 11 embodiment, are used in the welded seal shown in FIG. 12.

Figure 13:
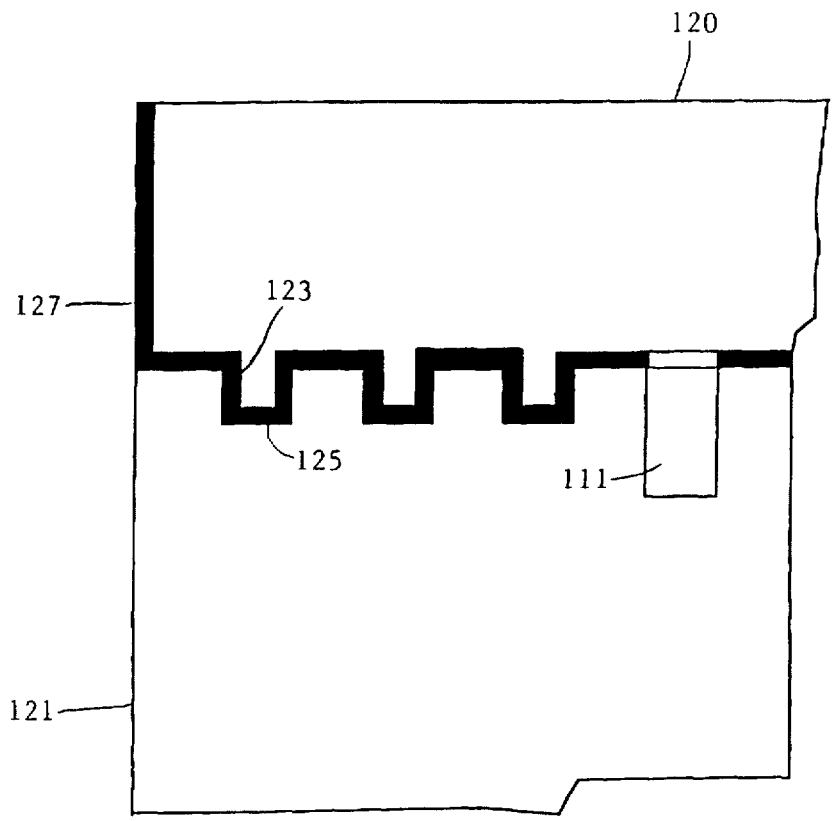
FIG. 13 is a partial elevational cross-sectional corner detail of a configuration used for sealing the glass plate to the housing without damaging the crystal. The configuration includes grooves in the housing wall and protrusions in the glass plate and a seal between them. At least one moisture absorbing barrier is also shown.

FIG. 13 shows an upper left corner of a housing 121 and glass plate 120. The glass plate 120 has projections 123 which fit in recesses 125 in the upper surface of the housing. A desiccant pocket 111 is formed in the upper surface of the housing.

An epoxy or glass-to-metal seal 127 is formed around the outer and lower peripheral edge of the glass plate and the upper surface of the housing. In the glass-to-metal seal the adjacent parts of the glass plate 120 are first doped with a component of the glass-to-metal seal or another substance which will strengthen the glass-to-metal bond.

Figure 14:
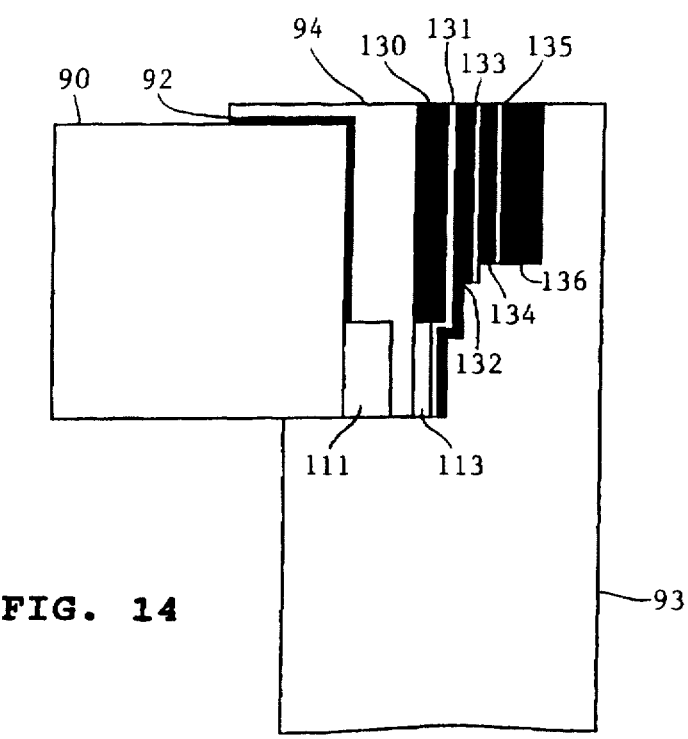
FIG. 14 is a partial elevational cross-sectional corner detail of a configuration used for sealing the glass plate to the housing without damaging the crystal. The seal has multiple rings and multiple moisture barriers.

FIG. 14 shows a housing 93 and a glass plate 90 joined by an L-shaped ring 94 with a glass-to-metal seal or epoxy 92 and a plural series of rings 131, 133 and 135, with corresponding epoxy layers 130, 132, 134 and 136. Desiccant is disposed in pockets 111 and 113.

The multiple rings 131, 133 and 135 and the interposed epoxy 130, 132, 134 and 136 add to the strength fo the structure.

Figure 15:
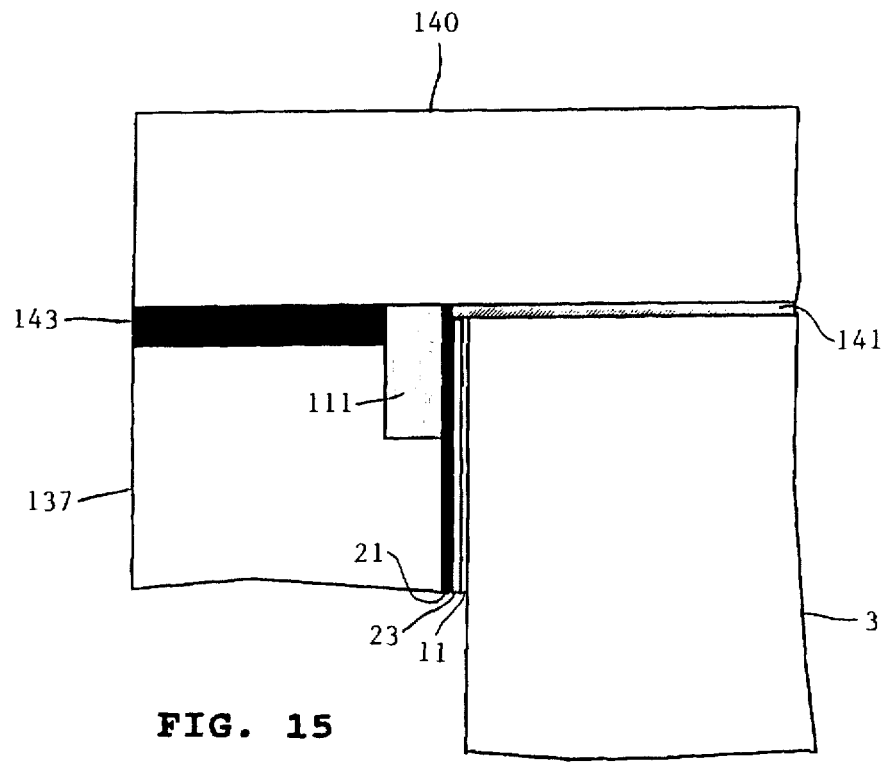
FIG. 15 is a partial elevational cross-sectional corner detail of a seal of a crystal wherein the glass plate is joined to the top of the housing by a glass-to-metal seal. The housing in this case provides part of the reflective layer and surrounds the last cladding layer. The reflective surface is on the inside of the housing wall. An optical coupler is mounted between the crystal and the glass plate, and at least one moisture barrier surrounds the crystal.

As shown in FIG. 15, a glass plate 140 overlying a crystal 3 and optical coupler 141 is joined to a housing 137 using a glass-to-metal seal 143 or epoxy. A pocket 111 contains desiccant. The mirror 21, outer cladding 23 and inner cladding 11 are partially shown.

The glass-to-metal seal in all these cases forms a strong bond and can take temperature variances and shock. The particular epoxy or glass-to-metal seal is chosen for its affinity to the glass and to the metal, or to the doped glass and the metal, and its coefficient of expansion.

Figure 16:
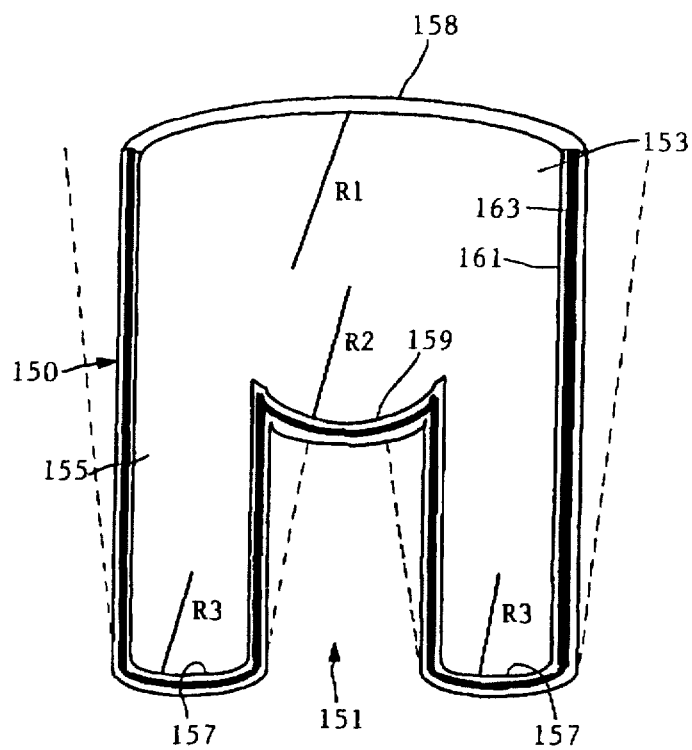
FIG. 16 shows a well-type crystal configuration. The outer bottom is annular and convex; the inner crystal bottom is convex. The top of the well is concave, and the top of the crystal is convex. The crystal, cladding and reflector are shown in cylindrical form; the crystal and/or cladding and reflector may be of truncated conical or pyramidal form.

FIG. 16 shows a well-type crystal 150 with a well 151 and a main body 153 connected to a lower annular body 155. The surfaces of the crystal at the bottom of the lower body are curved surfaces 157, and the lower surface 159 of the main body 153 is also curved. The upper surface 158 of the main body is curved.

As shown in FIG. 16, the entire crystal 150 is surrounded by a cladding 161 and a mirror 163. The curved surfaces 157, 158 and 159 cooperate with the cladding 161 and the mirror surface 163 to direct photons to the photodetector at the top of the curved lens-like surface 158. Most of the gamma rays that impinge upon the crystal 150 are coming from the well 151.

In one preferred embodiment of the invention, the well crystal 150 is made with an outward sloping outer wall 161 and an inward sloping inner wall 163 in the well to further aid the directing of the photons toward the photodetector at the top 158. In either embodiment, the bottom walls 157 and 159 and the top wall 158 may be flat or may be made of any curvature which will aid the light collection abilities of the photodetector placed on top of the well crystal.

Figure 17:
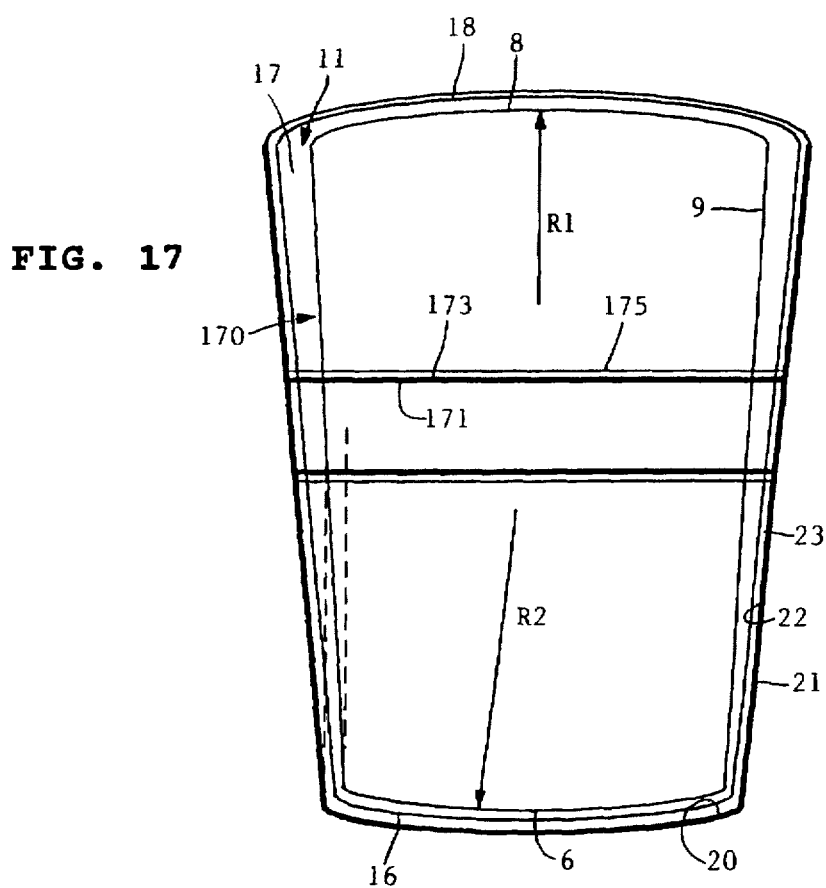
FIGS. 17 and 18 show crystal configurations having a through-holes extending through the crystal for passing fluids stained with radioactive substances such as radioactive iodine through tubes extending through the holes. The cladding layers, the reflective layer, the shape of the crystal shown here are exemplary. All geometries are considered applicable to the through-hole crystal configuration.
Figure 18:
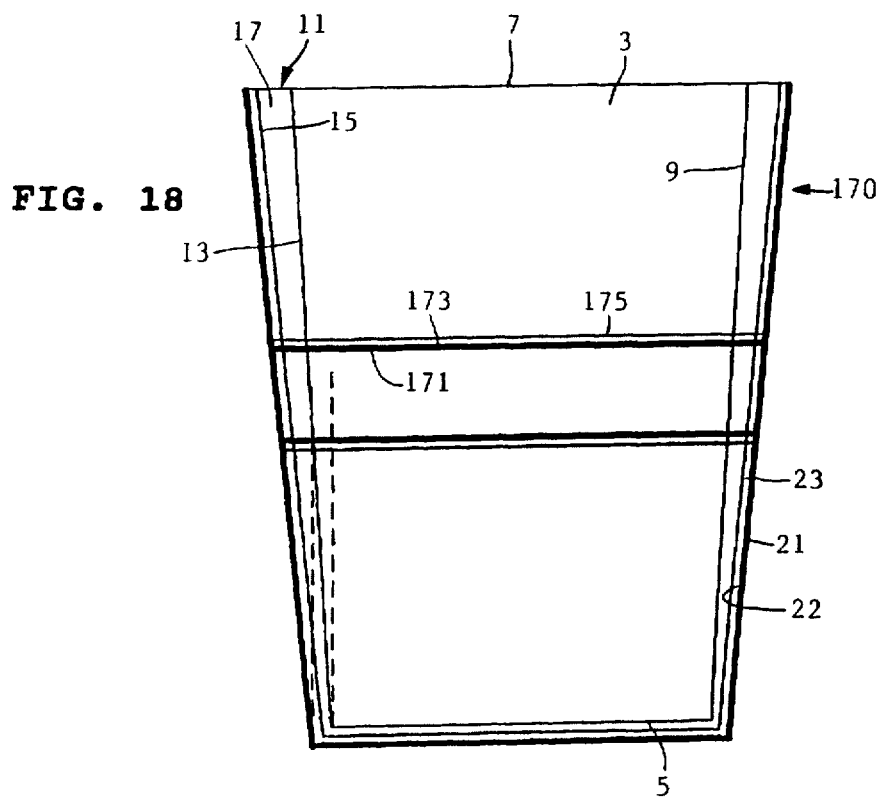
Figure 19:
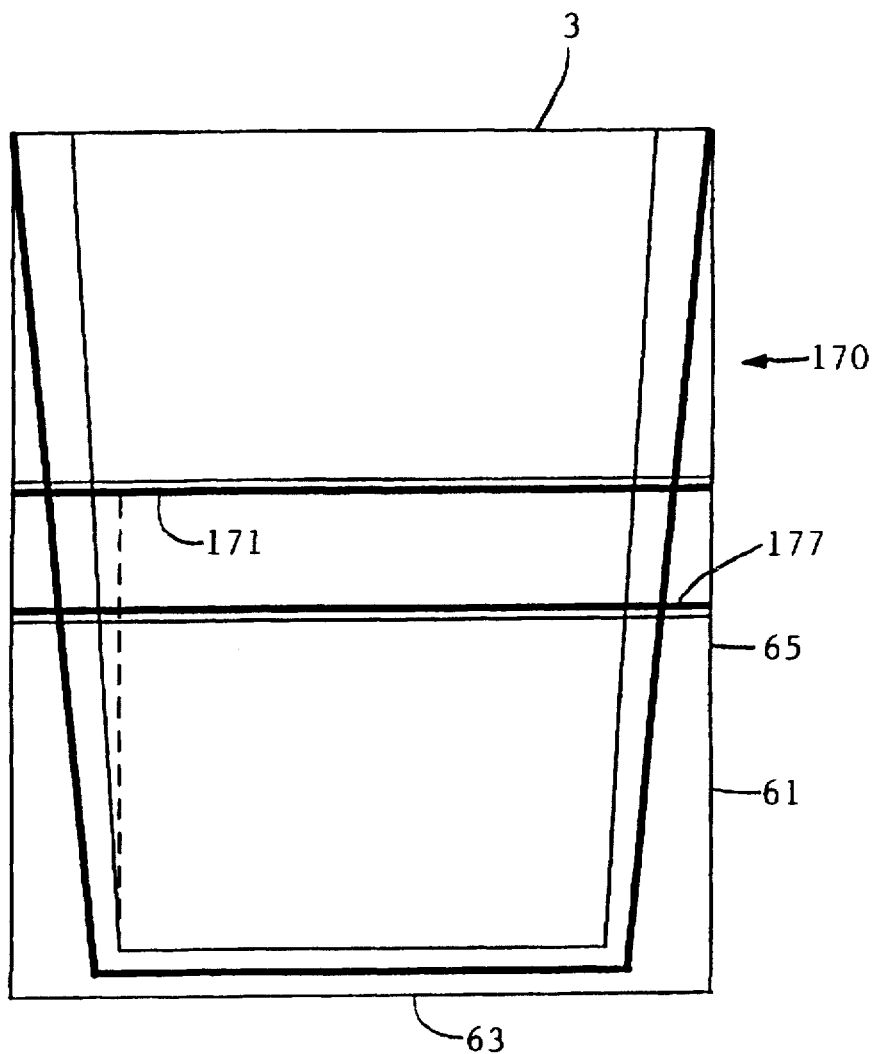
FIG. 19 shows the crystal of FIG. 18 in a housing.

FIGS. 17, 18 and 19 show modifications of through-hole crystal subassemblies. The holes 171 extending through the through-hole crystals 170 receive tubes through which radioactive material flows. The gamma rays resulting from the radioactive material are changed to photons by the crystal 170 and are gathered in photodetectors at the top.

The particular crystal shown in FIG. 17 is similar to the crystal shown in FIG. 4, with a curved lower surface 6 and a curved upper surface 8. The side walls 9 of the crystal are sloped outwardly and upwardly. The first cladding layer 11 has a wedge-shaped side wall 17, a curved upper surface 18 and a curved lower surface 16. The outer cladding 23 uniformly extends around the inner surface 22 of the mirror 21. The lower surface 20 of the mirror is curved similar to the surfaces 6 and 16, with the entire purpose of promoting the shortening of the optical paths of the photons from the scintillation centers in the crystal to the photodetector.

FIG. 18 shows a through-hole crystal assembly 170 which is similar in construction to the crystal shown in FIG. 1. The through-hole 171 is surrounded by a mirror 173 and a cladding 175 in tubular form. The tube section 171 is made of a low gamma absorption material to pass the maximum number of low energy gamma rays into the crystal. The tube may be advantageously formed of structures similar to those shown in FIGS. 9A, 9B and 9C.

The through-hole crystal assembly shown in FIG. 19 is similar to the crystal assembly shown in FIG. 6. The housing 61 side wall 63 has a hole 177 which extends through the housing 61 in alignment with the tubular opening 171 in the crystal 3.

In all of the cases shown in FIGS. 17, 18 and 19, the crystal structures may be any of the structures shown in any one of FIGS. 1–8, and all of the structures described herein may be round in cross-section or may be rectangular or polygonal in horizontal cross-section.

Figure 20:
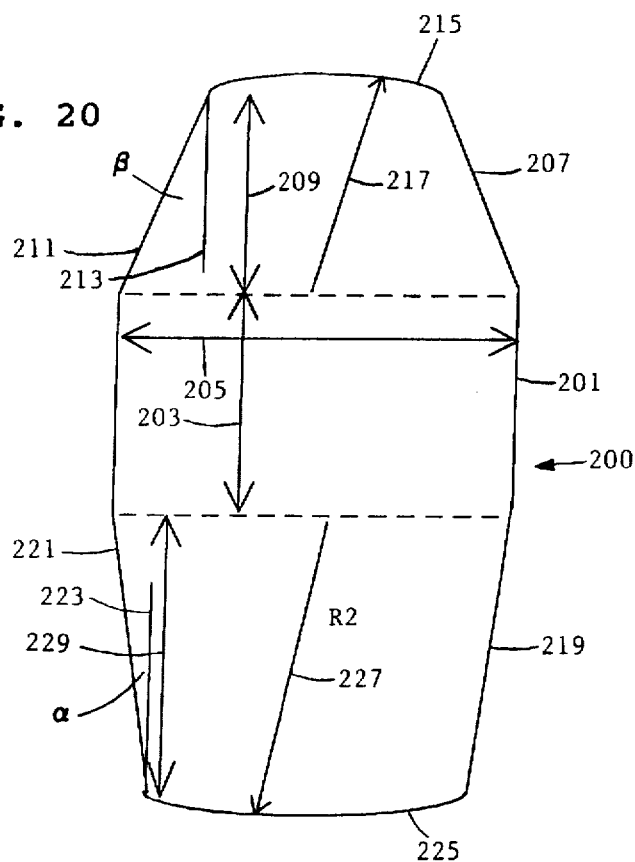
FIG. 20 shows a crystal with a cylindrical or polygonal body with two conical or pyramidal truncated ends.

FIG. 20 shows a crystal 200 with a cylindrical or polygonal central body 201 having a height 203 and having a major axis or diameter 205. The upper body 207 is formed as a first truncated cone or pyramid with a height 209 and side walls 211 at an angle beta to a vertical 213. The end 215 is formed as a curved surface on a radius 217 from a center of an intersection between the central body 201 and the upper body 207. The lower body 219 is formed as a second truncated cone or pyramid with a wall 221 on an angle alpha to a vertical 223. The lower body has a curved lower surface 225 formed on a radius 227. The height 229 of the lower body is longer than the height 209 of the upper body. Either or both of the upper and lower bodies may be formed as truncated cones or pyramids. The purpose of the shape of the body is to sense events, and particularly gamma rays which the crystal changes into photons, and to transmit those photons through the upper surface 215 with minimal internal reflections which may otherwise dissipate the photons as heat within the crystal. It is desirable that the photons exit the upper surface 215 in as small a radius as practicable to accommodate ruggedized photodetectors.

Figure 21:
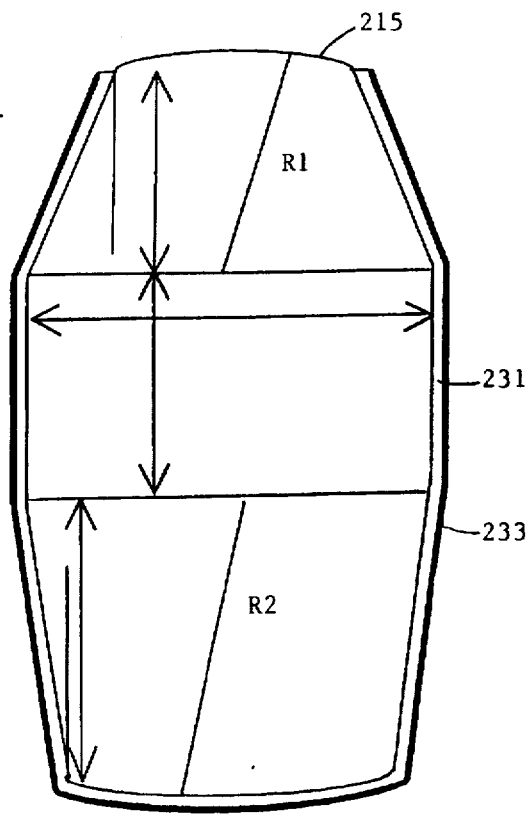
FIG. 21 is an elevational cross-section of the crystal shown in FIG. 20 with a mirror and cladding assembly.

FIG. 21 shows a cross-section of the crystal 200 of FIG. 20, to which a cladding 231 and a mirror 233 have been added by coating the entire crystal with the exception of the upper surface 215. The purpose of the cladding and mirror is to capture and transmit every photon caused by an event within the crystal so that the photon exits the upper surface 215.

Figure 22:
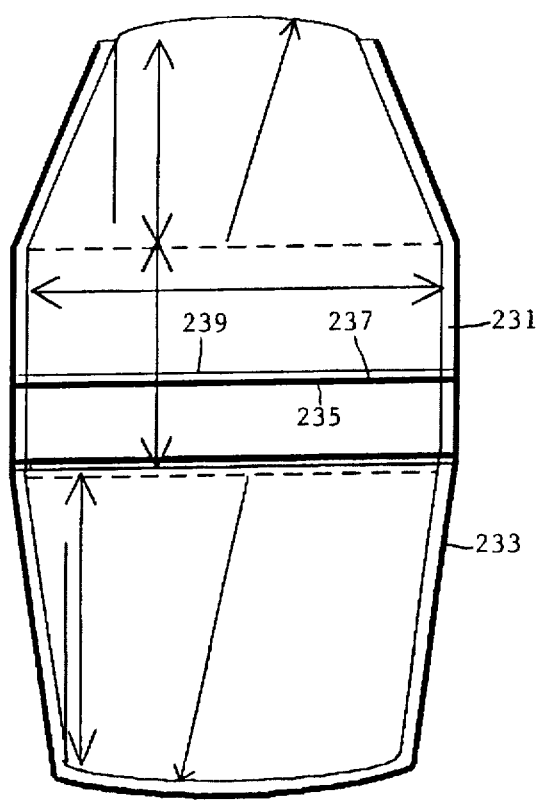
FIG. 22 is a cross-section of a crystal as shown in FIG. 21 with a through-hole.

FIG. 22 shows a crystal similar to the crystal 200 shown in FIG. 21 with the cladding 231 and the mirror 233, and in addition a through-hole 235. The through-hole usually has a cylindrical configuration, but may have an elongated form with a polygonal cross-section. A mirror 237 surrounds the through-hole 235, and a cladding 239 surrounds the mirror on the crystal side of the through-hole.

The through-hole allows the receiving of energy, particularly gamma rays, throughout the crystal. Often a tube transits the through-tube and energy and particle dissipating material flows through the tube. Gamma rays from material in the tube within the through-hole impinge in the crystal creating photons, which are reflected toward and out of the top to a photomultiplier. The tube is surrounded by cladding which may be an epoxy, and a mirror which reflects photons back into the through-hole crystal.

Figure 23:
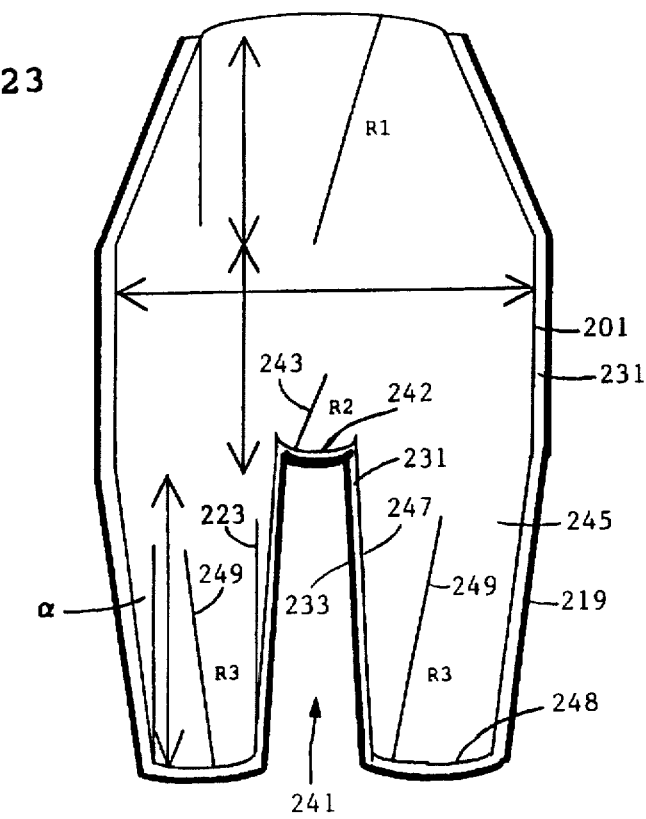
FIG. 23 is a cross-section of a crystal as shown in FIG. 21 with a well.

FIG. 23 shows a cross-section of a crystal such as shown in FIG. 21 with a well 241. The top of the well is formed by a convex surface 243 formed on the main body portion 201 of the crystal along radius 243. The lower body 219 is formed as an annular body 245 in which the inner walls taper inwardly at an angle less than the angle alpha from the vertical 223.

The well 241 is surrounded by sloping walls 247 of the peripheral portion 245 of the crystal. The curved bottom wall 248 of the peripheral portion is formed around radii 249. The outer peripheral portion 245 is surrounded by the cladding 231 and the mirror 233.

Figure 24:
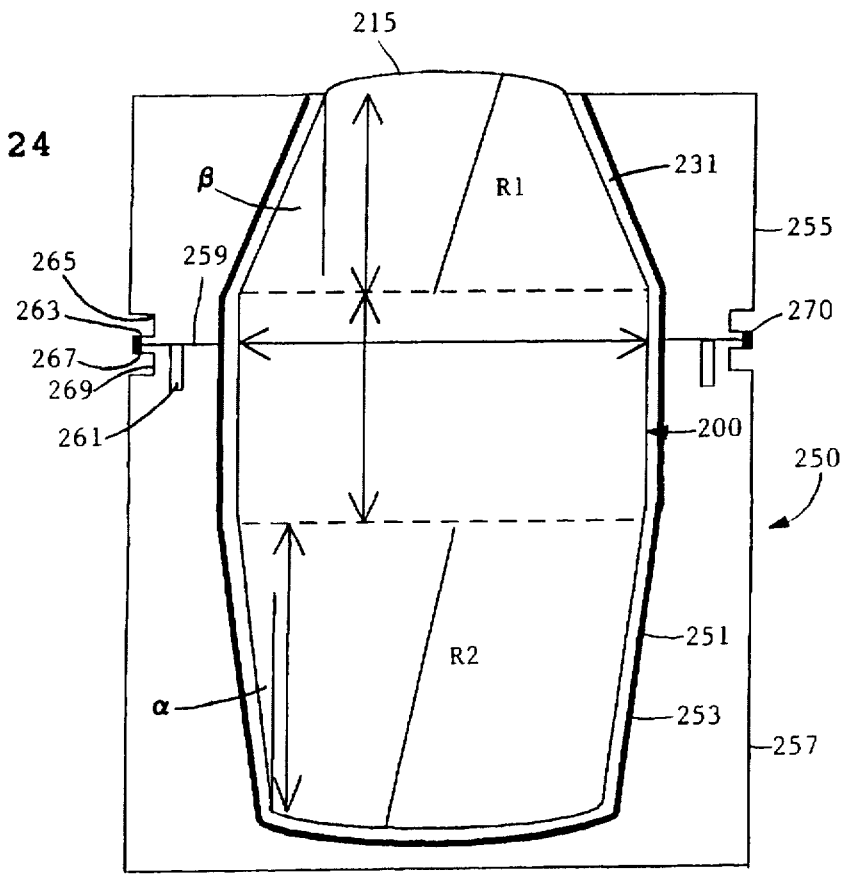
FIG. 24 is a partially cross-sectional elevation of a crystal of FIG. 20 in a split housing that has its internal wall constructed as a mirror. The crystal has the shape of a cylinder or polygon with double truncated conical or pyramidal ends and spherical surfaces.

FIG. 24 shows a partial cross-section of a crystal such as shown in FIG. 20, which is housed in a housing that has an internal wall constructed as a mirror. The crystal 200 is surrounded except at the upper surface by a cladding 231, and the cladding is surrounded by the mirror 251 which covers the interior surface 253 of the housing 250. The housing has an upper housing body 255 and a lower housing body 257, which are joined at a seam 259. The upper surface of the lower housing has a desiccant receiver 261, which holds desiccant to prevent any moisture from entering the system to disrupt the tight mirrored surface 251 or to penetrate that surface into the cladding 231. The upper body 255 has a thin edge 263 extending from a recess 265, the lower body has a thin edge 267 extending from a recess 269, and the thin edges are welded 270 to secure the upper housing 255 and the lower housing 257. The thin edges 263 and 267 prevent the transmission of major heat [of?] welding inward to affect the housing 250 or the crystal 200. The crystal 200 shown in FIG. 24 has the shape of a cylinder or a polygon with double truncated conical or pyramidal ends and spherical end surfaces.

Figure 25:
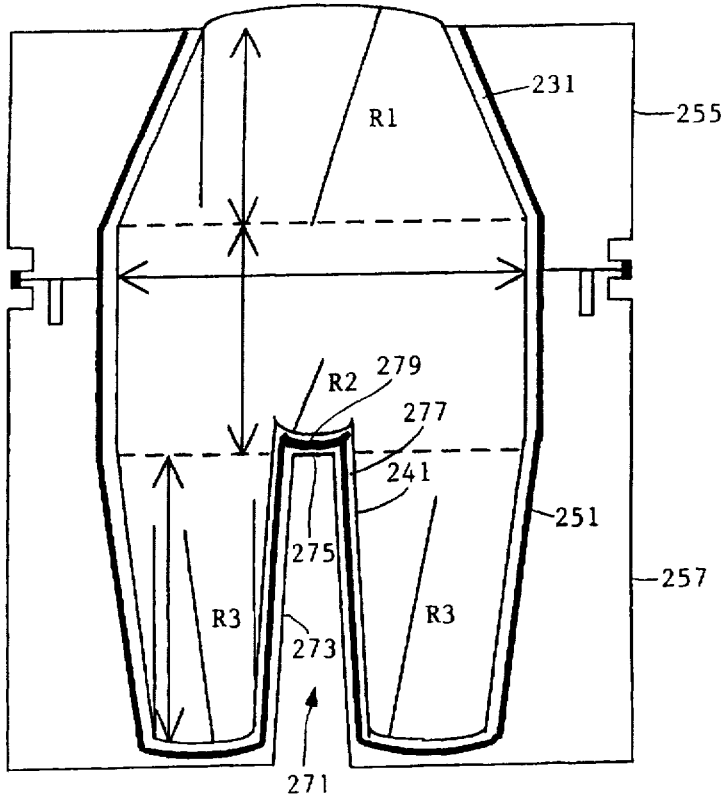
FIG. 25 is a cross-sectional elevation of a well crystal in a split housing that has a mirror as an internal wall. The crystal has a shape of a cylinder or polygon with double truncated conical or pyramidal ends and spherical surfaces. The well in the bottom truncated portion of the crystal can extend within the body and the upper truncated portion, should that be necessary to optimize the crystal parameters.

FIG. 25 shows a crystal with a well 241 mounted in a housing in which the lower housing has a well 271. The well 271 in the bottom truncated portion of the crystal can extend within the central body of the crystal and within the upper truncated portion of the crystal, should that be necessary to optimize the crystal parameters. In the latter cases the well 271 in the housing may extend upward to the extent of the upward extending well 241 in the crystal. The well 271 in the lower housing 257 may extend into the center of the upper crystal portion, which is housed in the upper housing. The well in the housing has a thin metal wall 273 with an upper end 275, and is surrounded by mirrors 277 and 279, which form part of the entirety of the mirrored surface 251, which lines the upper and lower bodies 255 and 257. The cladding material 231 extends entirely around the crystal between the mirror 251 and the housing.

Figure 26:
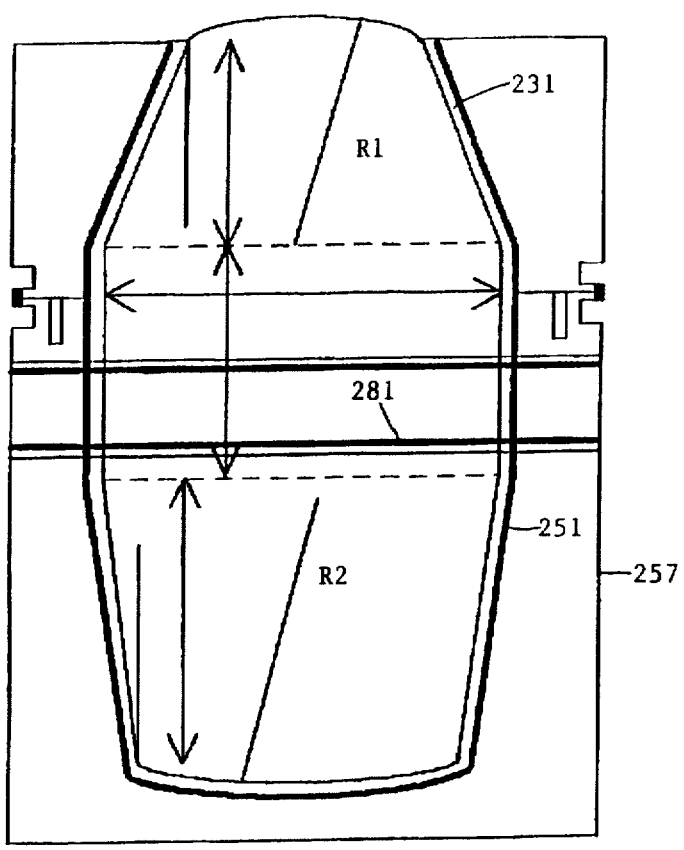
FIG. 26 is a cross-sectional elevation of a through-hole crystal in a split housing that has that has a mirror as an internal wall. The crystal has a shape of a cylinder or polygon with double truncated conical or pyramidal ends and spherical surfaces. The through-hole can be in the crystal to optimize the crystal parameters, depending on the crystal geometry.

FIG. 26 shows a partially cross-sectional elevation of a through-hole crystal, such as shown in FIG. 21, mounted within a split housing that has an internal mirror. The mirror 251 has a central elongated cylindrical or polygonal portion 281, which completely surrounds the opening which extends through the lower housing 257 in completion of the mirror 251 on the housing wall. The cladding 231 extends completely around the crystal and through-hole between the mirror and the crystal.

Figure 27:
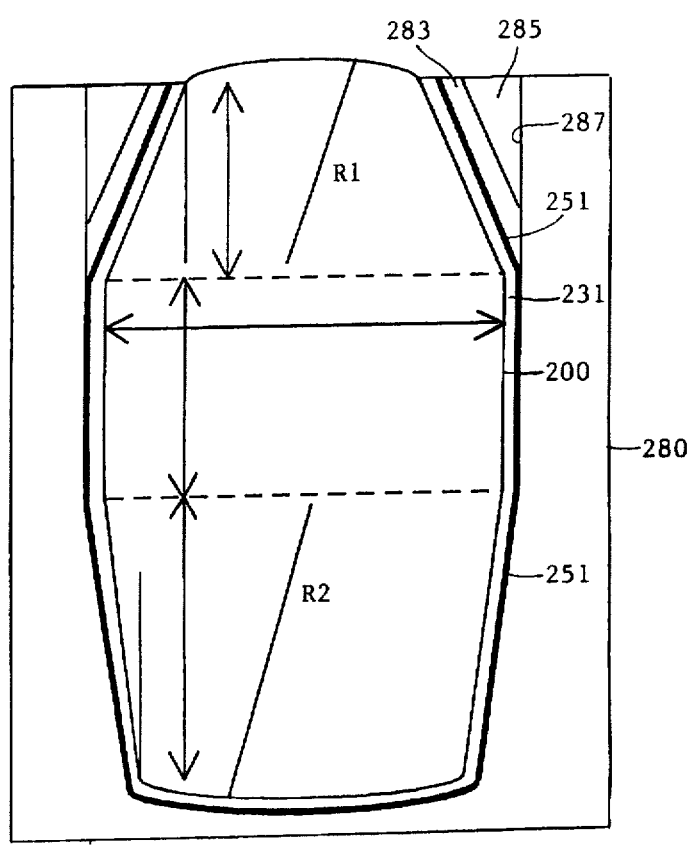
FIG. 27 is a cross-sectional elevation of a crystal in a single modular housing with an inner mirror wall. The crystal has a shape of a cylinder or polygon with double truncated conical or pyramidal ends.

FIG. 27 shows a cross-sectional elevation of a crystal 200 in a single modular housing 280, with an inner mirror wall 251. Cladding 231 surrounds the crystal, and the mirror 251 extends upward along the inner wall of a housing insert 283 made of housing-type material. An annular ring of epoxy 285 surrounds the upper portion of the mirror within the opening 287 in the housing. After the crystal 200 is inserted in the housing with the cladding layer 231 formed, the housing insert 283 is inserted with its mirrored inner surface and the epoxy ring 285 is added to close the housing. The crystal 200 has a shape of a cylinder or polygon with double truncated conical or pyramidal ends.

Figure 28:
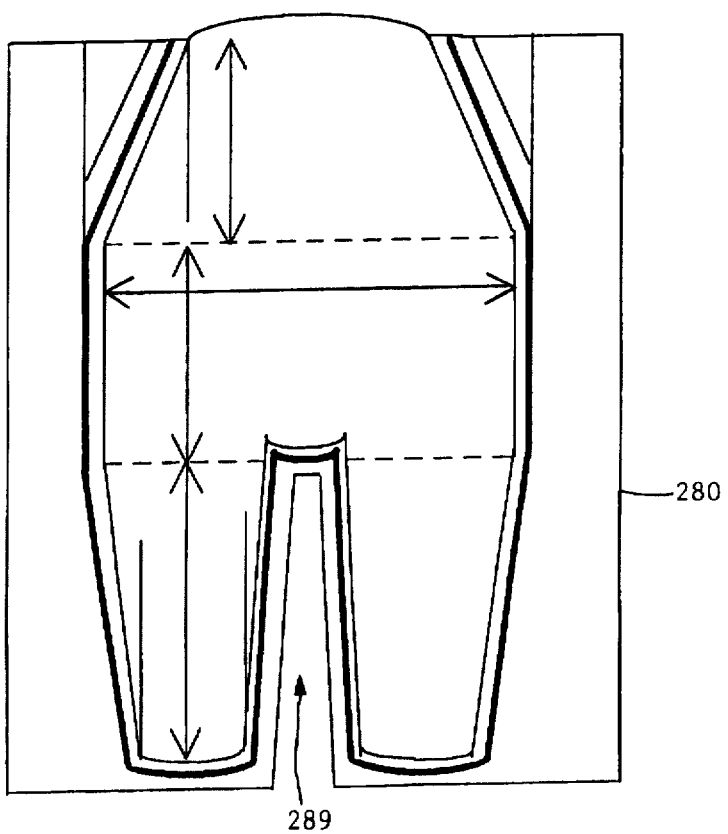
FIG. 28 shows a well crystal in a single modular housing with an inner mirror wall. The crystal has a shape of a cylinder or polygon with double truncated conical or pyramidal ends.

FIG. 28 shows a well crystal similar to the well crystal shown in FIG. 25 mounted within a unitary housing 280 with a well 289. The other elements of the housing are similar to the housing shown in FIG. 27. The crystal shown in FIG. 28 has a cylinder or polygon shape with a double truncated conical or pyramidal end and with a pyramidal or conical well.

Figure 29:
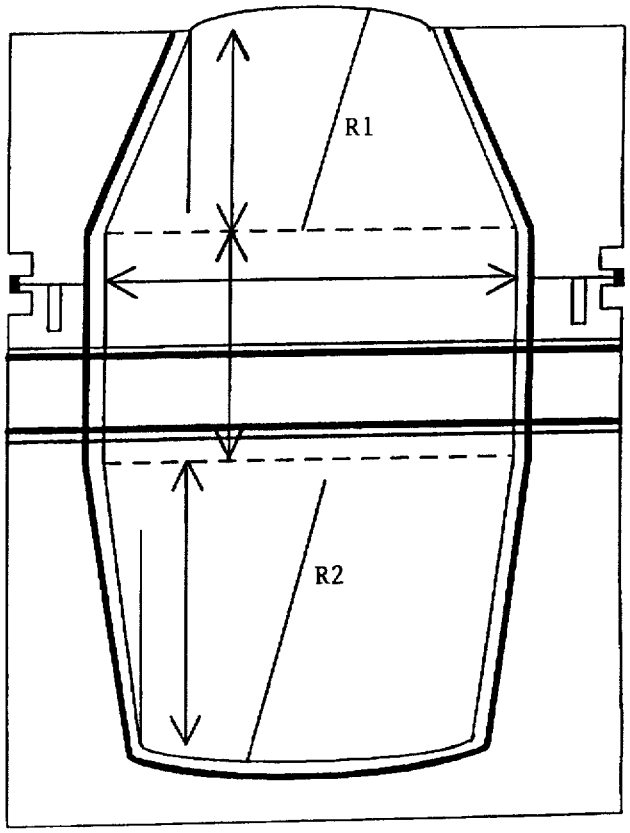
FIG. 29 shows a through-hole crystal in a split type housing that has a mirror as an internal wall.

FIG. 29 shows a through-hole crystal in a split housing that has a mirror as an internal wall.

Figure 30:
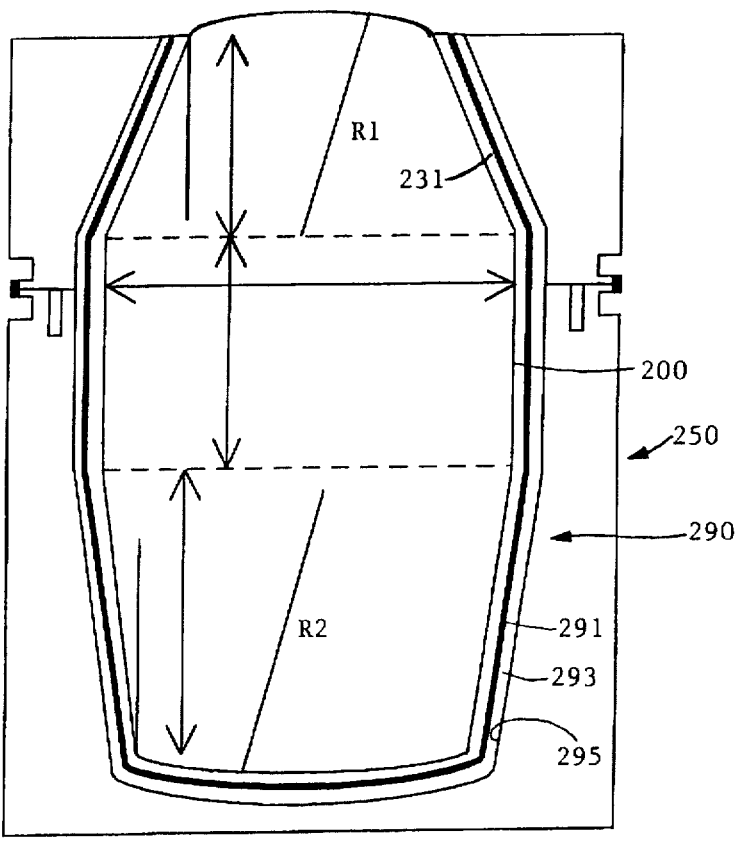
FIG. 30 shows a crystal with a mirror system in a split housing.

FIG. 30 shows a crystal 200 in a split-type housing with a mirror system surrounding the crystal. The mirror system 290 includes a mirror 291 between two layers of cladding 231 and 293. The crystal 200 is constructed, and the cladding layer 231 is added, before adding the mirror layer 291 and the outer cladding layer 293, which spaces the mirror 291 from the interior wall 295 of the split housing 250. The outer cladding layer 293 ensures a tight fit within the housing to prevent air- or moisture-entrapping voids, ensures the easy penetration of rays, and particularly gamma rays, into the crystal, and protects the mirror to ensure complete reflection of photons formed within the crystal.

Figure 31:
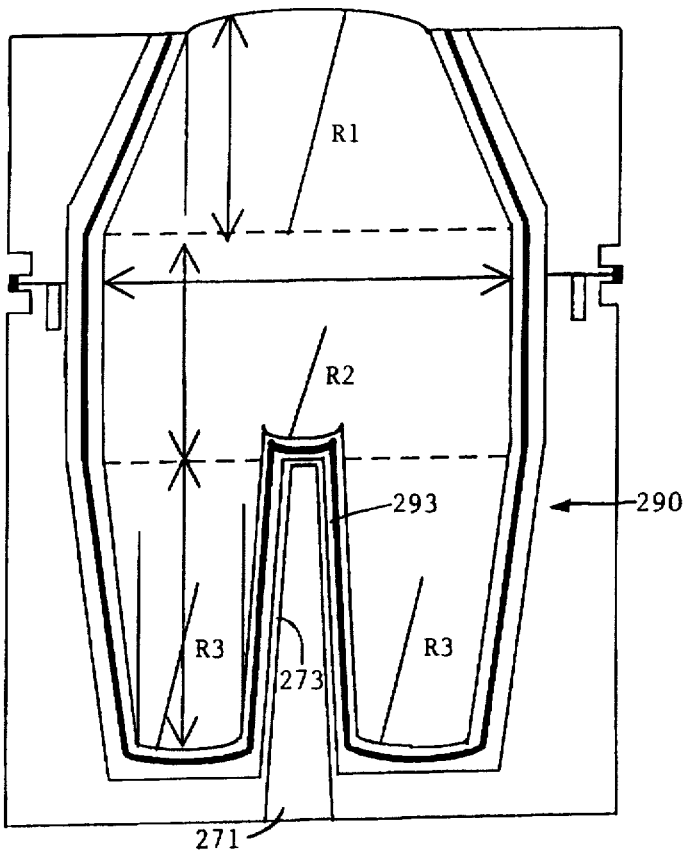
FIG. 31 shows a well crystal with a mirror system in a split housing. The crystal has a shape of a cylinder or polygon with double truncated conical or pyramidal ends.

FIG. 31 shows a well crystal within a mirror system 290 similar to the mirror system shown in FIG. 30, with the exception that the housing has a well 271 with a thin wall 273, which is surrounded by the outer cladding 293.

Figure 32:
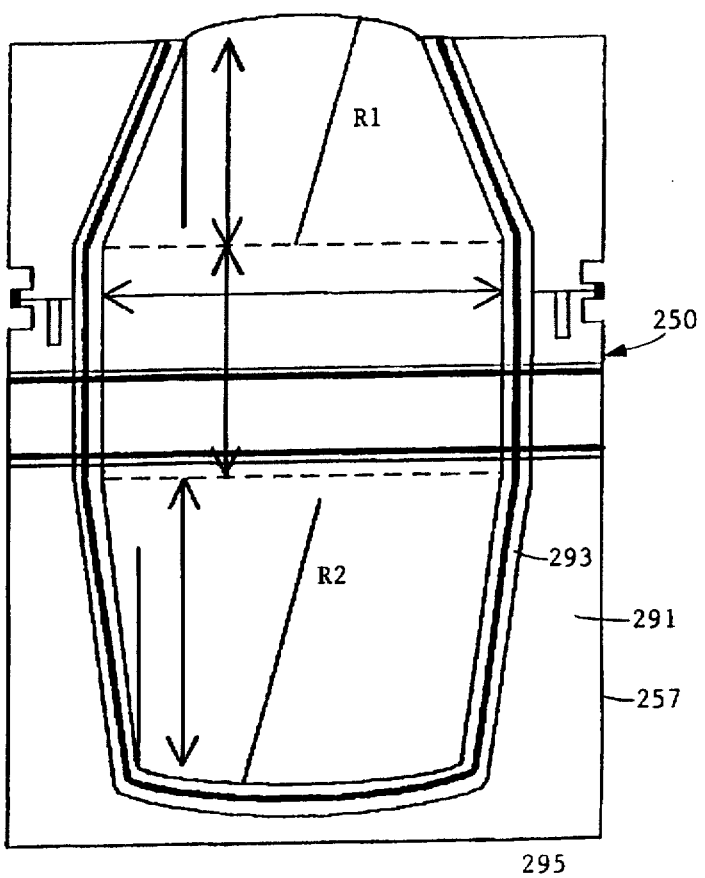
FIG. 32 shows a through-hole crystal with a mirror system in a split housing.

FIG. 32 shows a through-hole crystal with a mirror system 291 mounted in a split housing 250 with a through-hole. The cladding 293 surrounds the mirror, with the exception of in the through-hole. Cladding 293 may be added within the through-hole when a thin cylinder is inserted in the through-hole following the mounting of the crystal in the lower housing 257.

Figure 33:
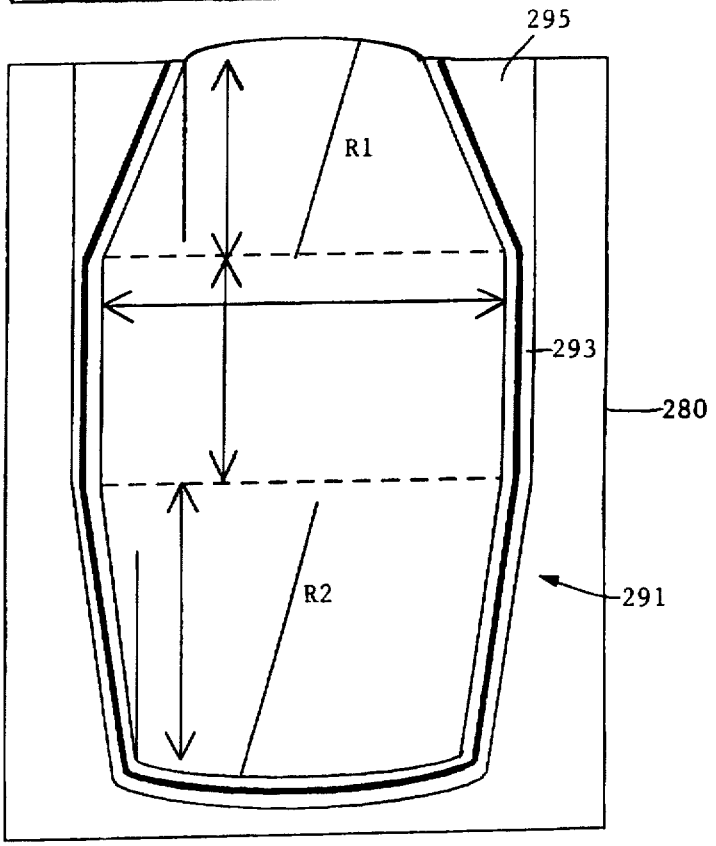
FIG. 33 shows a crystal with a mirror system in a single housing.

FIG. 33 shows a crystal with a mirror system 291 mounted in a single housing 280. The outer cladding material 293, which may be an epoxy or resin, extends throughout the large area 295 at the top of the crystal.

Figure 34:
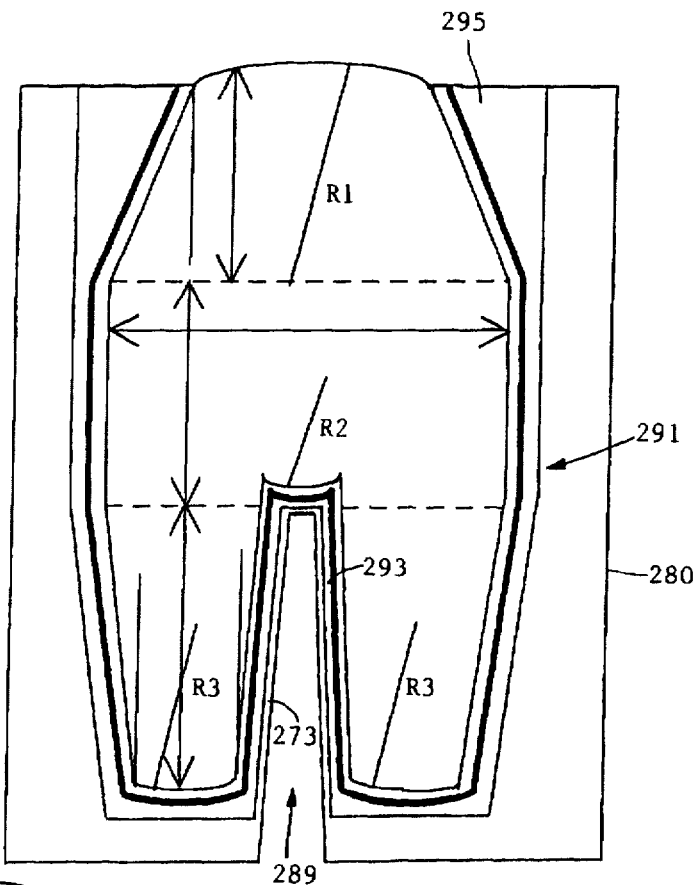
FIG. 34 shows a well crystal with a mirror system in a single housing. The crystal has a shape of a cylinder or polygon with double truncated conical or pyramidal ends. The well can extend as deep into the crystal as necessary to obtain optimized crystal parameters.

FIG. 34 shows a well crystal with a mirror system 291 within a single housing 280. The outer cladding layer, which may be an epoxy or resin, extends around the thin central wall 273 of the well 289, and extends upward in the large volume 295 between the upper portion of the crystal and the inner wall of the housing 280.

Figure 35:
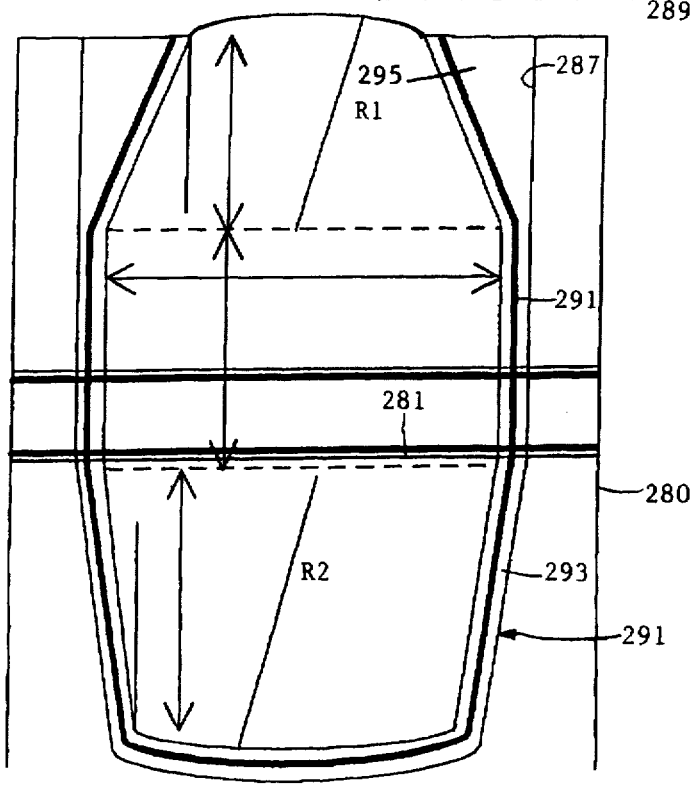
FIG. 35 shows a through-hole crystal with a mirror system in single housing. The through-hole can be in any part of the crystal to optimize the crystal parameters.
Figure 36:
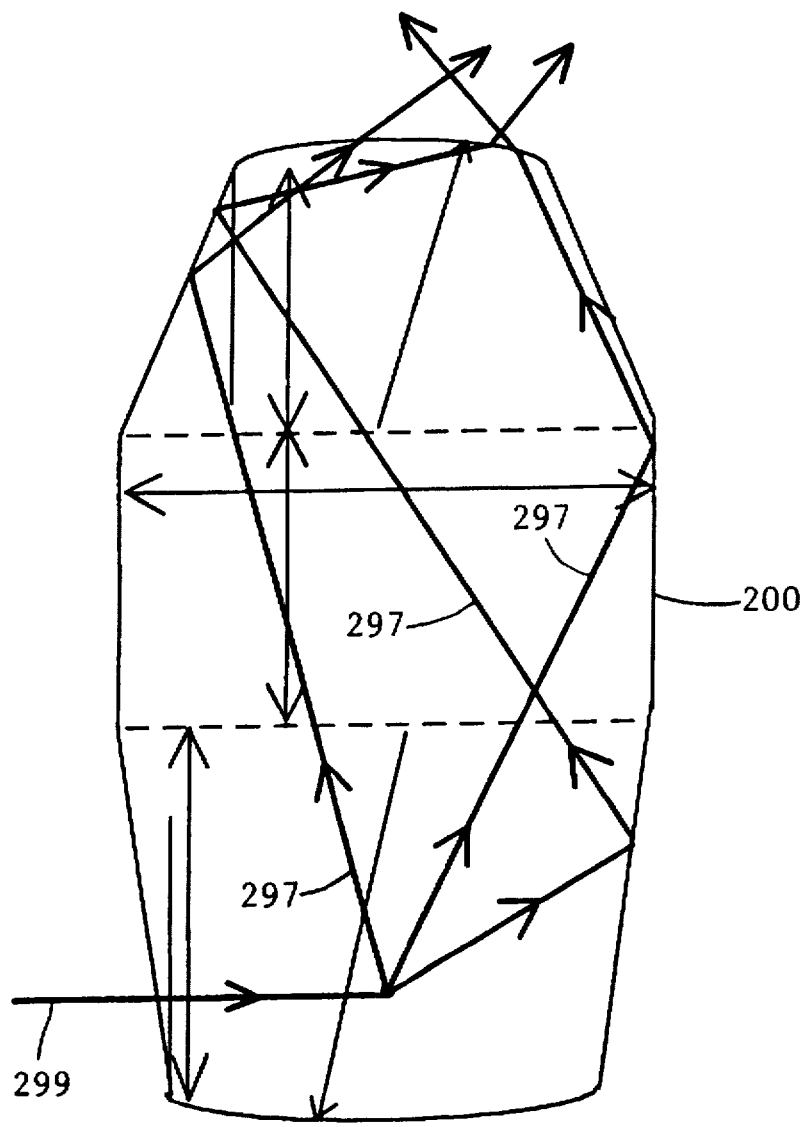
FIG. 36 is a schematic representation of photon paths.

FIG. 35 shows a cross-sectional view of a through-hole crystal with a mirror system 291 mounted in a single housing 280. The epoxy 293 which surrounds the mirror 291 extends upward in the wide area between the upper portion of the crystal and the internal wall 287 of the housing 280. The outer epoxy or cladding layer 293 does not extend outside the mirror portion 281 which extends through the crystal unless a [thin walled?] insert is added after the crystal is inserted in the housing 280.

While the invention has been described with reference to specific embodiments, modifications and variations of the invention may be constructed without departing from the scope of the invention, which is defined in the following claims.

I claim:

1. A crystal apparatus comprising a crystal for use in scintillator detectors, the crystal having a doped crystal with a top, sides and a bottom, wherein the crystal has a generally truncated conical or pyramidal shape, with sides of the crystal extending upward and outward from the bottom of the crystal toward the top of the crystal, a cladding lightguide having an outer wall and having an inner wall surrounding the bottom and sides of the crystal and a mirror surrounding the cladding.

2. The apparatus of claim 1, wherein the sides of the crystal which extend upward and outward from the bottom surround and form with the bottom a crystal bottom portion, and wherein the crystal further comprises an upper portion having sides extending inward and upward to the top.

3. The apparatus of claim 2, wherein the crystal further comprises a middle portion between the top portion and the bottom portion.

4. The apparatus of claim 3, wherein sides of the middle portion extend generally vertically.

5. The apparatus of claim 4, further comprising a mirror surrounding the bottom and sides.

6. The apparatus of claim 4, further comprising a cladding having an outer wall and having an inner wall surrounding the bottom and sides of the crystal and a mirror surrounding the cladding.

7. The apparatus of claim 1, wherein the mirror surrounding the cladding is a specular mirror.

8. The apparatus of claim 1, further comprising a second cladding layer having a uniform thickness inside the mirror.

9. The apparatus of claim 1, wherein the outer wall of the cladding has an angle of slope that is greater than the angle of slope of sides the crystal, thereby creating a cladding having a wedge shape, with the cladding increasing in thickness as it extends upward.

10. The apparatus of claim 1, wherein the crystal has a convex top and a convex bottom.

11. The apparatus of claim 1, further comprising a housing surrounding the crystal, and wherein the mirror is integral with an inner wall of the housing.

12. The apparatus of claim 1, further comprising a housing having at least one low energy gamma ray window.

13. The apparatus of claim 12, wherein the at least one window has a shape selected from the group consisting of curved, circular, polygonal and rectangular windows.

14. The apparatus of claim 13, wherein the housing has multiple windows, and wherein the windows are arranged in a grill-shaped configuration.

15. The apparatus of claim 14, wherein the housing is made of a material selected from the group consisting of metal, metal alloys, composite material and a combination of metal, metal alloys and composite material and non-metal materials.

16. The apparatus of claim 1, further comprising a housing and a cushioning layer positioned between the crystal and the housing, and wherein the housing further comprises at least one protrusion extending inward from the housing towards the crystal and being embedded in the cushioning material.

17. A crystal apparatus comprising a crystal for use in scintillator detectors, the crystal having a doped crystal with a top, sides and a bottom, wherein the crystal has a generally truncated conical or pyramidal shape, with sides of the crystal extending upward and outward from the bottom of the crystal toward the top of the crystal, wherein the crystal has a bottom well extending upward from the bottom into the crystal, the well having a well top and well sides extending downward from the well top, and wherein the bottom of the crystal is annular around the well, and further comprising cladding covering the bottom and sides of the well, and a mirror covering the cladding on the crystal and in the well.

18. The apparatus of claim 17, wherein the sides of the well extending upward and inward towards the top of the well.

19. The apparatus of claim 17, wherein the top of the well is generally convex with respect to the crystal, the annular bottom is generally convex, and the top of the crystal is generally convex.

20. A crystal apparatus comprising a crystal for use in scintillator detectors, the crystal having a doped crystal with a top, sides and a bottom, wherein the crystal has a generally truncated conical or pyramidal shape, with sides of the crystal extending upward and outward from the bottom of the crystal toward the top of the crystal, further comprising a through-hole extending through the crystal and through sides of the crystal for receiving a tube through which gamma ray producing materials pass.

21. A scintillation detector apparatus comprising a crystal subassembly and a housing surrounding the subassembly, wherein the housing has at least one low energy gamma ray window, and wherein the subassembly further comprises a crystal having a top, sides, an annular bottom and a well extending upward from the bottom into the doped crystal, the well having a well top and well sides extending downward from the well top and joining the bottom of the crystal, a cladding surrounding the bottom and sides of the crystal and the well top and well sides, and a mirror surrounding the cladding.

22. The apparatus of claim 21, wherein the at least one window comprises multiple windows arranged in a grill-shaped configuration.

23. The apparatus of claim 22, wherein the housing is made of a material selected from the group consisting of metal, metal alloys, composite material, and a combination of metal, metal alloys and composite material, and wherein the windows are constructed of low absorption gamma ray material.

24. The apparatus of claim 21, further comprising a cushioning layer positioned between the subassembly and the housing, and wherein the housing further comprises at least one protrusion extending inward from the housing towards the subassembly and being embedded in the cushioning material.

25. The apparatus of claim 23, wherein the mirror is integral with an inner wall of the cushioning layer.

26. The apparatus of claim 21, wherein the cladding has an angle of slope that is greater than the angle of slope of the crystal, thereby creating a cladding layer having a wedge shape, with the layer increasing in thickness as the layer extends upward.

27. The apparatus of claim 26, wherein the crystal has a generally rectangular shape, with the sides of the crystal generally perpendicular to the top and bottom of the crystal, which are generally parallel.

28. The apparatus of claim 21, wherein the crystal has a generally truncated conical or pyramidal shape, with the sides of the crystal extending upward and outward from the bottom of the crystal then upward and then upward and inward to the top of the crystal, and the well sides sloping inward and upward from the bottom of the crystal.

29. A scintillation detector apparatus comprising a crystal subassembly and a housing surrounding the subassembly, wherein the housing has at least one low energy gamma ray window, and wherein the subassembly further comprises a doped crystal having a top, sides and a bottom, a cladding surrounding the bottom and sides of the crystal, a mirror surrounding the cladding, a through-hole extending through the housing and the crystal and extending through the sides of the crystal, the cladding and the mirror surrounding the through-hole and a tube extending through the through-hole for carrying materials which emit energy.

30. A well logging scintillation detector apparatus, comprising a crystal subassembly having a doped crystal, a cladding lightguide and a specular mirror surrounding the crystal, a housing surrounding the subassembly, an optical system positioned above the top of the crystal, the optical system further comprising a lens, at least one glass plate and an optical coupler for coupling the at least one glass plate to the top of the crystal, a photomultiplier mounted above the optical system, an electronics package connected to the photomultiplier, a casing surrounding the subassembly, the housing, the photomultiplier, the electronics package and the optical system, and a radiation source positioned in the casing at a bottom or along a side wall of the casing for irradiating adjacent materials to generate rays which extend into the crystal.

31. The apparatus of claim 30, wherein the casing has at least one low absorption window for admitting low energy gamma rays.

32. The apparatus of claim 31, wherein the at least one window has a shape selected from the group consisting of circular and rectangular.

33. The apparatus of claim 30, wherein the at least one window is multiple windows, and wherein the windows are arranged in a grill-shaped configuration.

34. The apparatus of claim 30, wherein the casing is made of a material selected from the group consisting of metal, metal alloys, composite material, and a combination of metal, metal alloys or composite material.

35. The apparatus of claim 30, further comprising a cushioning layer positioned between the subassembly and the housing, and wherein the housing further comprises at least one protrusion extending inward from the housing towards the subassembly and being embedded in the cushioning material.

36. The apparatus of claim 30, wherein the crystal has a double truncated shape with an upper portion, a middle portion and a lower portion, a bottom, a top and side walls, side walls of the lower portion extending upward and outward, side walls of the middle portion extending upward, and side walls of the upper portion extending upward and inward.

37. A scintillation detector apparatus, comprising a doped crystal having a top, a bottom and sides, a cladding lightguide surrounding the bottom and sides of the crystal, a housing surrounding the crystal and cladding, a specular mirror positioned between the cladding and the housing, a glass plate positioned above the top of the crystal, and a seal connecting the glass plate to the housing.

38. The apparatus of claim 37, wherein the mirror is a reflective layer which forms the inner surface of the housing.

39. The apparatus of claim 37, further comprising an optical coupler positioned between the glass plate and the crystal, and further comprising an optical system positioned adjacent the glass plate and a photomultiplier positioned adjacent the optical system.

40. The apparatus of claim 37, further comprising a desiccant pocket extending from the seal.

41. The apparatus of claim 37, wherein the seal includes an epoxy or a glass-to-metal seal.

42. The apparatus of claim 37, wherein the seal further comprises first and second rings positioned around the glass plate, wherein the first ring is connected to the glass plate, and wherein the second ring is connected to the first ring and to the housing.

43. The apparatus of claim 42, wherein the rings are connected to each other and to the housing by welding, by soldering or by an epoxy.

44. The apparatus of claim 42, further comprising at least one moisture barrier positioned between the glass plate, the first ring and the housing, and at least one moisture barrier positioned between the second ring and the housing.

45. The apparatus of claim 37, wherein the seal further comprises grooves positioned in a wall of the housing and extensions extending from the glass plate, wherein the extensions fit into the grooves to effect the seal between the glass plate and the housing.

46. The apparatus of claim 45, further comprising at least one moisture barrier positioned at a seal surface.

47. The apparatus of claim 37, wherein the seal further comprises multiple rings positioned around the glass plate, wherein an innermost ring of the multiple rings is connected to the glass and wherein other rings of the multiple rings are sealed to each other.

48. The apparatus of claim 37, wherein the crystal has a double truncated shape with an upper portion, a middle portion and a lower portion, a bottom, a top and side walls, side walls of the lower portion extending upward and outward, side walls of the middle portion extending upward, and side walls of the upper portion extending upward and inward.

49. The apparatus of claim 48, wherein the housing comprises a split housing having an upper section and a lower section, wherein a crystal is inserted in the housing before welding an outer periphery of a thin ring on the upper section to an outer periphery of a thin ring on the lower section.

50. The apparatus of claim 48, wherein the housing comprises a cylinder having a cylindrical inner wall, and further comprising a housing insert positioned along sides of the crystal upper portion, and epoxy between the housing insert and an inner wall of the housing.

51. A scintillator apparatus comprising a scintillator for use in scintillation detectors, the scintillator having a top, sides and a bottom, wherein the scintillator has a generally truncated conical or pyramidal shape, with sides of the scintillator extending upward and outward from the bottom of the scintillator toward the top of the scintillator, a cladding lightguide having an outer wall and having an inner wall surrounding the bottom and sides of the scintillator and a specular mirror surrounding the cladding.

52. The apparatus of claim 51, wherein the sides of the scintillation which extend upward and outward from the bottom surround and form with the bottom a scintillator bottom portion, and wherein the scintillator further comprises an upper portion having sides extending inward and upward to the top.

53. The apparatus of claim 52, wherein the scintillator further comprises a middle portion between the top portion and the bottom portion.

54. The apparatus of claim 53, wherein sides of the middle portion extend generally vertically.

55. The apparatus of claim 54, further comprising a mirror surrounding the bottom and sides.

56. The apparatus of claim 54, further comprising a cladding having an outer wall and having an inner wall surrounding the bottom and sides of the scintillator and a mirror surrounding the cladding.

57. The apparatus of claim 51, wherein the cladding has a wedge shape.

58. The apparatus of claim 51, further comprising a second cladding layer having a uniform thickness inside the mirror.

59. The apparatus of claim 51, wherein the outer wall of the cladding has an angle of slope that is greater than the angle of slope of sides the scintillator, thereby creating cladding having a wedge shape, with the cladding increasing in thickness as it extends upward.

60. The apparatus of claim 51, wherein the scintillator has a convex top and a convex bottom.

61. The apparatus of claim 51, further comprising a housing surrounding the scintillator, and wherein the mirror is integral with an inner wall of the housing.

62. The apparatus of claim 51, further comprising a housing having at least one low energy gamma ray window.

63. The apparatus of claim 62, wherein the at least one window has a shape selected from the group consisting of curved, circular, polygonal and rectangular windows.

64. The apparatus of claim 63, wherein the housing has multiple windows, and wherein the windows are arranged in a grill-shaped configuration.

65. The apparatus of claim 64, wherein the housing is made of a material selected from the group consisting of metal, metal alloys, composite material and a combination of metal, metal alloys and composite material and non-metal materials.

66. The apparatus of claim 51, further comprising a housing and a cushioning layer positioned between the scintillator and the housing, and wherein the housing further comprises at least one protrusion extending inward from the housing towards the scintillator and being embedded in the cushioning material.

67. A scintillator apparatus comprising a scintillator for use in scintillation detectors, the scintillator having a top, sides and a bottom, wherein the scintillator has a generally truncated conical or pyramidal shape, with sides of the scintillator extending upward and outward from the bottom of the scintillator toward the top of the scintillator, wherein the scintillator has a bottom well extending upward from the bottom into the scintillator, the well having a well top and well sides extending downward from the well top, and wherein the bottom of the scintillator is annular around the well, and further comprising cladding covering the bottom and sides of the scintillator and the top and sides of the well, and a mirror covering the cladding on the scintillator and in the well.

68. The apparatus of claim 67, wherein the sides of the well extending upward and inward towards the top of the well.

69. The apparatus of claim 67, wherein the top of the well is generally convex with respect to the scintillator, the annular bottom is generally convex, and the top of the scintillator is generally convex.

70. A scintillator apparatus comprising a scintillator for use in scintillation detectors, the scintillator having a top, sides and a bottom, wherein the scintillator has a generally truncated conical or pyramidal shape, with sides of the scintillator extending upward and outward from the bottom of the scintillator toward the top of the scintillator, further comprising a through-hole extending through the scintillator and through sides of the scintillator for receiving a tube through which gamma ray producing materials pass.

71. A scintillation detector apparatus comprising a scintillator subassembly and a housing surrounding the subassembly, wherein the housing has at least one low energy gamma ray window, and wherein the subassembly further comprises a scintillator having a top, sides, an annular bottom and a well extending upward from the bottom into the scintillator, the well having a well top and well sides extending downward from the well top and joining the bottom of the scintillator, a cladding surrounding the bottom and sides of the scintillator and the well top and well sides, and a mirror surrounding the cladding.

72. The apparatus of claim 71, wherein the at least one window comprises multiple windows arranged in a grill-shaped configuration.

73. The apparatus of claim 72, wherein the housing is made of a material selected from the group consisting of metal, metal alloys, composite material, and a combination of metal, metal alloys and composite material, and wherein the windows are constructed of low absorption gamma ray material.

74. The apparatus of claim 71, further comprising a cushioning layer positioned between the subassembly and the housing, and wherein the housing further comprises at least one protrusion extending inward from the housing towards the subassembly and being embedded in the cushioning material.

75. The apparatus of claim 73, wherein the mirror is integral with an inner wall of the cushioning layer.

76. The apparatus of claim 71, wherein the cladding has an angle of slope that is greater than the angle of slope of the scintillator, thereby creating a cladding layer having a wedge shape, with the layer increasing in thickness as the layer extends upward.

77. The apparatus of claim 76, wherein the scintillator has a generally rectangular shape, with the sides of the scintillator generally perpendicular to the top and bottom of the scintillator, which are generally parallel.

78. The apparatus of claim 71, wherein the scintillator has a generally truncated conical or pyramidal shape, with the sides of the scintillator extending upward and outward from the bottom of the scintillator then upward and then upward and inward to the top of the scintillator, and the well sides sloping inward and upward from the bottom of the scintillator.

79. A scintillation detector apparatus comprising a scintillator subassembly and a housing surrounding the subassembly, wherein the housing has at least one low energy gamma ray window, and wherein the subassembly further comprises a scintillator having a top, sides and a bottom, a cladding surrounding the bottom and sides of the scintillator, a mirror surrounding the cladding, a through-hole extending through the housing and the scintillator and extending through the sides of the scintillator, the cladding and the mirror surrounding the through-hole and a tube extending through the through-hole for carrying materials which emit energy.

80. A well logging scintillation detector apparatus, comprising a scintillator subassembly having a scintillator, a cladding lightguide and a specular mirror surrounding the scintillator, a housing surrounding the subassembly, an optical system positioned above the top of the scintillator, the optical system further comprising a lens, at least one glass plate and an optical coupler for coupling the at least one glass plate to the top of the scintillator, a photomultiplier mounted above the optical system, an electronics package connected to the photomultiplier, a casing surrounding the subassembly, the housing, the photomultiplier, the electronics package and the optical system, and a radiation source positioned in the casing at a bottom or along a side wall of the casing for irradiating adjacent materials to generate rays which extend into the scintillator.

81. The apparatus of claim 80, wherein the casing has at least one low absorption window for admitting low energy gamma rays.

82. The apparatus of claim 81, wherein the at least one window has a shape selected from the group consisting of circular and rectangular.

83. The apparatus of claim 80, wherein the at least one window is multiple windows, and wherein the windows are arranged in a grill-shaped configuration.

84. The apparatus of claim 80, wherein the casing is made of a material selected from the group consisting of metal, metal alloys, composite material, and a combination of metal, metal alloys or composite material.

85. The apparatus of claim 80, further comprising a cushioning layer positioned between the subassembly and the housing, and wherein the housing further comprises at least one protrusion extending inward from the housing towards the subassembly and being embedded in the cushioning material.

86. The apparatus of claim 80, wherein the scintillator has a double truncated shape with an upper portion, a middle portion and a lower portion, a bottom, a top and side walls, side walls of the lower portion extending upward and outward, side walls of the middle portion extending upward, and side walls of the upper portion extending upward and inward.

87. A scintillation detector apparatus, comprising a scintillator having a top, a bottom and sides, a cladding light-guide surrounding the bottom and sides of the scintillator, a housing surrounding the scintillator and cladding, a specular mirror positioned between the cladding and the housing, a glass plate positioned above the top of the scintillator, and a seal connecting the glass plate to the housing.

88. The apparatus of claim 87, wherein the mirror is a reflective layer which forms the inner surface of the housing.

89. The apparatus of claim 87, further comprising an optical coupler positioned between the glass plate and the scintillator, and further comprising an optical system positioned adjacent the glass plate and a photomultiplier positioned adjacent the optical system.

90. The apparatus of claim 87, further comprising a desiccant pocket extending from the seal.

91. The apparatus of claim 87, wherein the seal includes an epoxy or a glass-to-metal seal.

92. The apparatus of claim 87, wherein the seal further comprises first and second rings positioned around the glass plate, wherein the first ring is connected to the glass plate, and wherein the second ring is connected to the first ring and to the housing.

93. The apparatus of claim 92, wherein the rings are connected to each other and to the housing by welding, by soldering or by an epoxy.

94. The apparatus of claim 92, further comprising at least one moisture barrier positioned between the glass plate, the first ring and the housing, and at least one moisture barrier positioned between the second ring and the housing.

95. The apparatus of claim 87, wherein the seal further comprises grooves positioned in a wall of the housing and extensions extending from the glass plate, wherein the extensions fit into the grooves to effect the seal between the glass plate and the housing.

96. The apparatus of claim 95, further comprising at least one moisture barrier positioned at a seal surface.

97. The apparatus of claim 87, wherein the seal further comprises multiple rings positioned around the glass plate, wherein an innermost ring of the multiple rings is connected to the glass and wherein other rings of the multiple rings are sealed to each other.

98. The apparatus of claim 87, wherein the scintillator has a double truncated shape with an upper portion, a middle portion and a lower portion, a bottom, a top and side walls, side walls of the lower portion extending upward and outward, side walls of the middle portion extending upward, and side walls of the upper portion extending upward and inward.

99. The apparatus of claim 98, wherein the housing comprises a split housing having an upper section and a lower section, wherein a scintillator is inserted in the housing before welding an outer periphery of a thin ring on the upper section to an outer periphery of a thin ring on the lower section.

100. The apparatus of claim 98, wherein the housing comprises a cylinder having a cylindrical inner wall, and further comprising a housing insert positioned along sides of the scintillator upper portion, and epoxy between the housing insert and an inner wall of the housing.

* * * * *